(12) United States Patent
Sato

(10) Patent No.: US 6,799,322 B2
(45) Date of Patent: Sep. 28, 2004

(54) DISK LOADING DEVICE

(75) Inventor: Hiroyuki Sato, Hamura (JP)

(73) Assignee: Teac Corporation, Tokyo (JP)

( * ) Notice: Subject to any disclaimer, the term of this patent is extended or adjusted under 35 U.S.C. 154(b) by 414 days.

(21) Appl. No.: 09/872,389

(22) Filed: Jun. 1, 2001

(65) Prior Publication Data

US 2001/0053116 A1 Dec. 20, 2001

(30) Foreign Application Priority Data

Jun. 6, 2000 (JP) ........................................ 2000-169415
Jun. 6, 2000 (JP) ........................................ 2000-169418
Jun. 6, 2000 (JP) ........................................ 2000-169420

(51) Int. Cl.$^7$ ............................................. G11B 33/02
(52) U.S. Cl. ...................................................... 720/623
(58) Field of Search .............................. 369/75.1, 75.2, 369/77.1, 77.2

(56) References Cited

U.S. PATENT DOCUMENTS 6,618,341 B1 * 9/2003 Yamashita et al. ......... 369/77.1

* cited by examiner

*Primary Examiner*—George J. Letscher
(74) *Attorney, Agent, or Firm*—Anderson Kill & Olick, P.C.; Eugene Lieberstein; Michael N. Meller

(57) ABSTRACT

A disk loading device for loading a disk into a disk loading device frame and unloading the inserted disk from the disk loading device frame has a first arm having a contacting part for contacting an edge of the disk in a direction of insertion of the disk and moving through a first plane parallel to a plane of movement of the disk; a second arm having a contacting part for contacting an edge of the disk in a direction opposite the direction of insertion of the disk and moving through a second plane parallel to the plane of movement of the disk; a motor that rotates the first arm and the second arm; and a control mechanism that causes the motor to rotate the second arm so that the contacting part of the second arm pushes the disk into the disk loading device when the disk is manually partially inserted in the disk loading device during a loading operation, and causes the motor to rotate the second arm so that the contacting part of the second arm pushes the disk out from the disk loading device during an unloading operation.

9 Claims, 25 Drawing Sheets

DISK LOADING IN PROGRESS

DISK LOADING COMPLETED

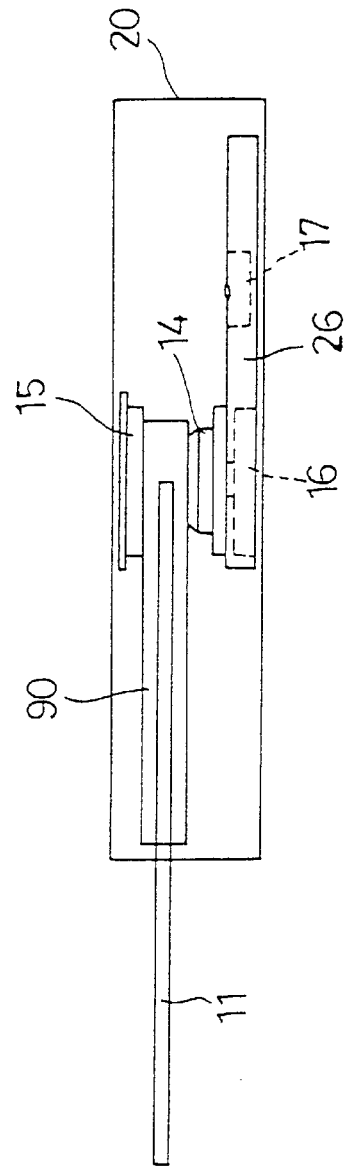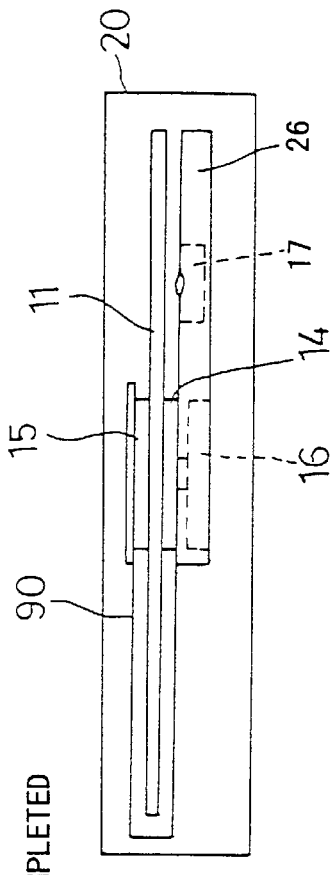

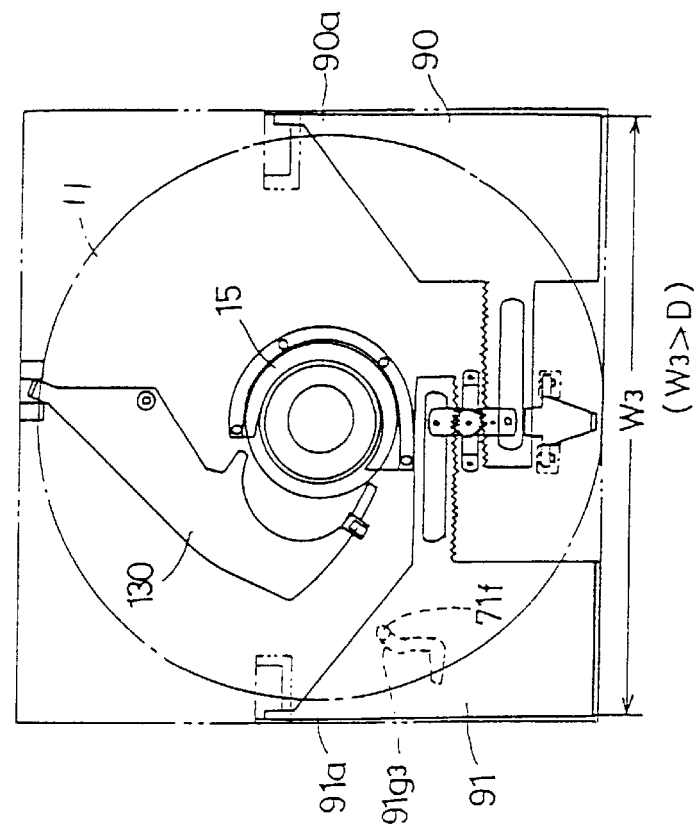
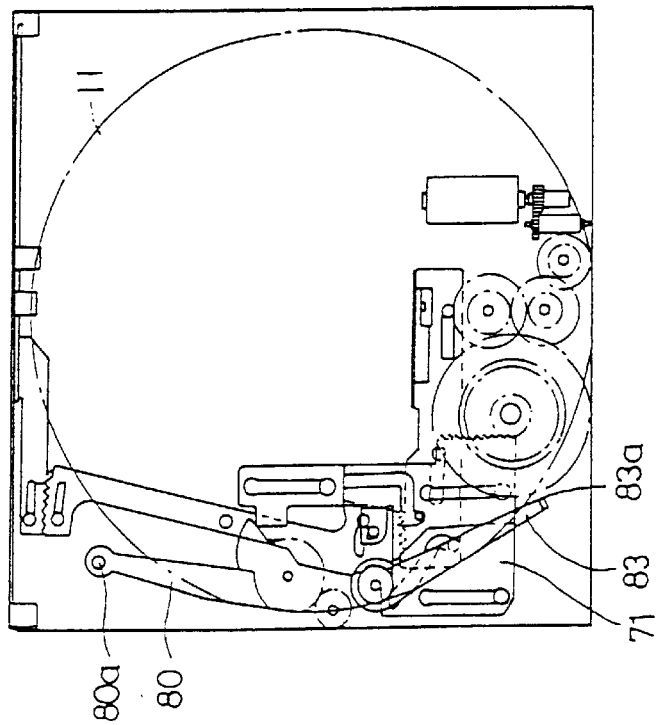

DISK LOADING DEVICE

BACKGROUND OF THE INVENTION

1. Field of the Invention

The present invention relates generally to a disk loading device, and more particularly, to a disk loading device in which a first arm used to insert a disk into a frame of the disk loading device and a second arm used to eject the disk from the frame of the disk loading device both rotate through a plane parallel to a direction of movement of the disk during loading and unloading operations, that is, in a substantially horizontal direction, resulting in a disk loading device that is slimmer than that obtainable with the conventional art.

2. Description of the Related Art

The conventional disk loading device employs rollers above and below a path transited by a disk being loaded into an apparatus, the rollers traversing the disk in the process of operation. When an operator inserts a disk into a disk insertion slot located on a front panel of an apparatus, the disk is sandwiched between the upper and lower roller pair, the rollers revolve and the disk is automatically drawn into the interior of the apparatus and loaded atop a turntable. When no longer needed the disk is grasped by the upper and lower roller pair, the rollers again rotate and the disk is ejected from the disk insertion slot located on the front of the apparatus.

As the apparatuses that employ disk drive units become more compact, the need for compact, slim disk loading devices has grown accordingly. However, in a conventional disk loading device such as that described above, the positioning of the rollers above and below the path transited by the disk during loading an unloading limits the extent to which the disk loading device can be made slimmer, which is undesirable.

Additionally, one of the two rollers necessarily contacts a recording surface of the disk, occasionally resulting in damage to that recording surface. Moreover, the movement of the disk depends on friction between the disk and the rollers, so if the rollers are worn then the movement of the disk becomes uncertain.

Additionally, the conventional disk loading device employs a clamp release mechanism that separates a clamper from the turntable so as to separate the disk from the turntable. Such a mechanism uses an arm positioned so as to rotate through a plane vertical to an underside surface of a cover panel of the disk loading device in such a way as to support the clamper at a position opposite the turntable. As the arm rotates perpendicular to the cover panel of the disk loading device the disk is alternately clamped to and separated from the turntable.

As may be appreciated, however, the very fact that this type of conventional clamp release mechanism rotates in a direction perpendicular to the cover panel of the disk loading device further complicates any effort to make the disk loading device slimmer.

Additionally, the conventional disk loading device operates up to a predetermined position in a direction calculated to eject the disk from the apparatus, in such a way that a proximal edge of the disk in the direction of the interior of the apparatus is supported by the disk loading device while at the same time the disk is projecting distally by a certain amount from the insertion slot located on the front panel of the apparatus. Such a disposition is inherently unstable, and becomes more so as wear on the internal parts of the disk loading device advances. In order to counteract such instability it is sometimes necessary to readjust the final position of the disk unloading operation of the disk loading device, which is inconvenient.

Additionally, in its state of partial projection from the disk insertion slot located on the front panel of the apparatus it is necessary to grasp the disk on both upper and lower surfaces thereof, including the recording surface. Improper handling can cause fingerprints, dust and so forth to adhere to the recording surface, in the worst case causing damage to the recording surface of the disk.

SUMMARY OF THE INVENTION

Accordingly, it is an object of the present invention to provide an improved and useful disk loading device in which the above-described drawbacks and disadvantages are eliminated.

Another, further and more specific object of the present invention is to provide an improved and useful disk loading device in which a first arm and a second arm both rotate through a plane parallel to a direction of movement of the disk during loading and unloading operations, that is, in a substantially horizontal direction.

The above-described object of the present invention is achieved by a disk loading device for loading a disk into a disk loading device frame and unloading the inserted disk from the disk loading device frame, the disk loading device comprising:

a first arm having a contacting part for contacting an edge of the disk in a direction of insertion of the disk and moving through a first plane parallel to a plane of movement of the disk;

a second arm having a contacting part for contacting an edge of the disk in a direction opposite the direction of insertion of the disk and moving through a second plane parallel to the plane of movement of the disk;

a motor that rotates the first arm and the second arm; and a control mechanism that causes the motor to rotate the second arm so that the contacting part of the second arm pushes the disk into the disk loading device when the disk is manually partially inserted in the disk loading device during a loading operation, and causes the motor to rotate the second arm so that the contacting part of the second arm pushes the disk out from the disk loading device during an unloading operation.

According to this aspect of the invention, the disk loading device can be made slimmer than is possible with the conventional art because the need for upper and lower rollers above and below the path of the disk for loading and unloading of the disk is eliminated.

BRIEF DESCRIPTION OF THE DRAWINGS

These and other objects, features, aspects and advantages of the present invention will become better understood and more apparent from the following description, appended claims and accompanying drawings, in which:

FIGS. 8A and 8B are front views of the disk loading device shown in FIG. 1 for the purpose of illustrating an operation thereof, in which FIG. 8A shows a state in which disk loading is in progress and FIG. 8B shows a state in which disk loading is completed;

FIGS. 9A and 9B are lateral views of the disk loading device shown in FIG. 1 for the purpose of illustrating an operation thereof, in which FIG. 9A shows a state in which disk loading is in progress and FIG. 9B shows a state in which disk loading is completed;

FIGS. 25A and 25B show a state in which disk loading is completed; and

DETAILED DESCRIPTION OF THE INVENTION

A detailed description will now be given of an improved disk loading device according to the present invention, with reference to the accompanying drawings. It should be noted that identical or corresponding elements are given identical or corresponding reference numbers in all drawings, with detailed descriptions thereof given once and thereafter omitted.

Figure 1:
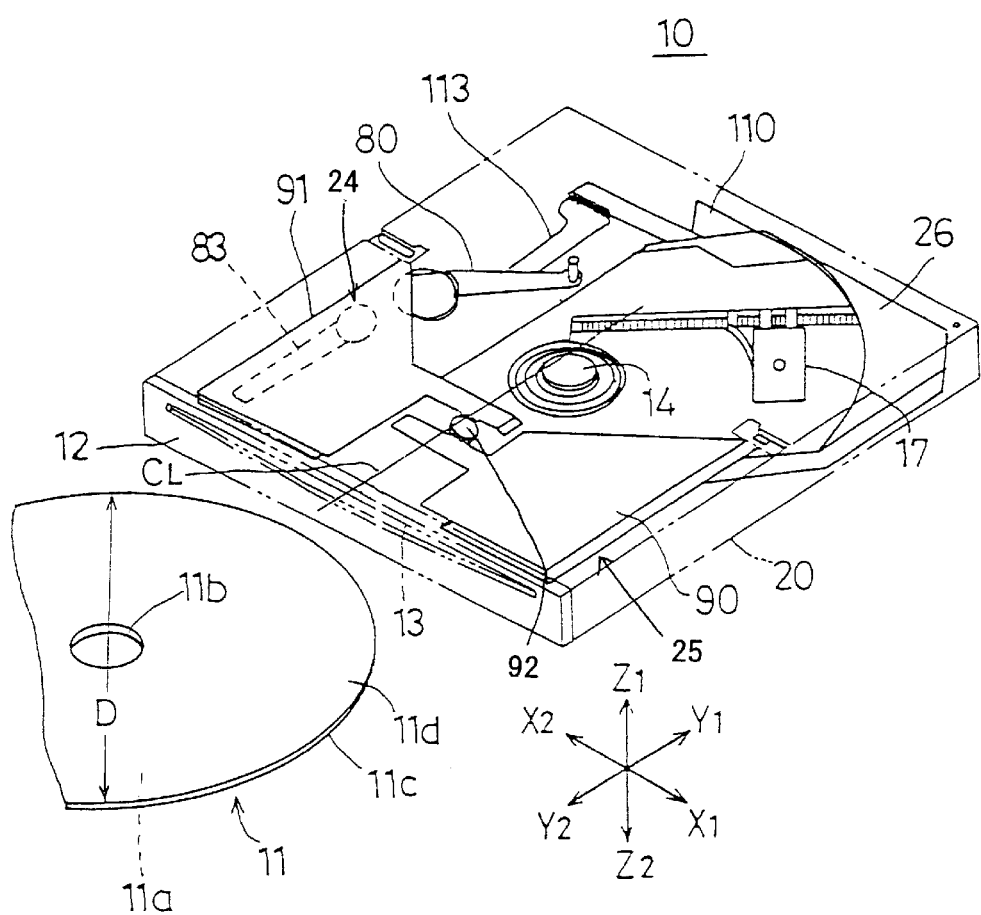
FIG. 1 is an perspective transparent view of a disk loading device according to one embodiment of the present invention.
Figure 2:
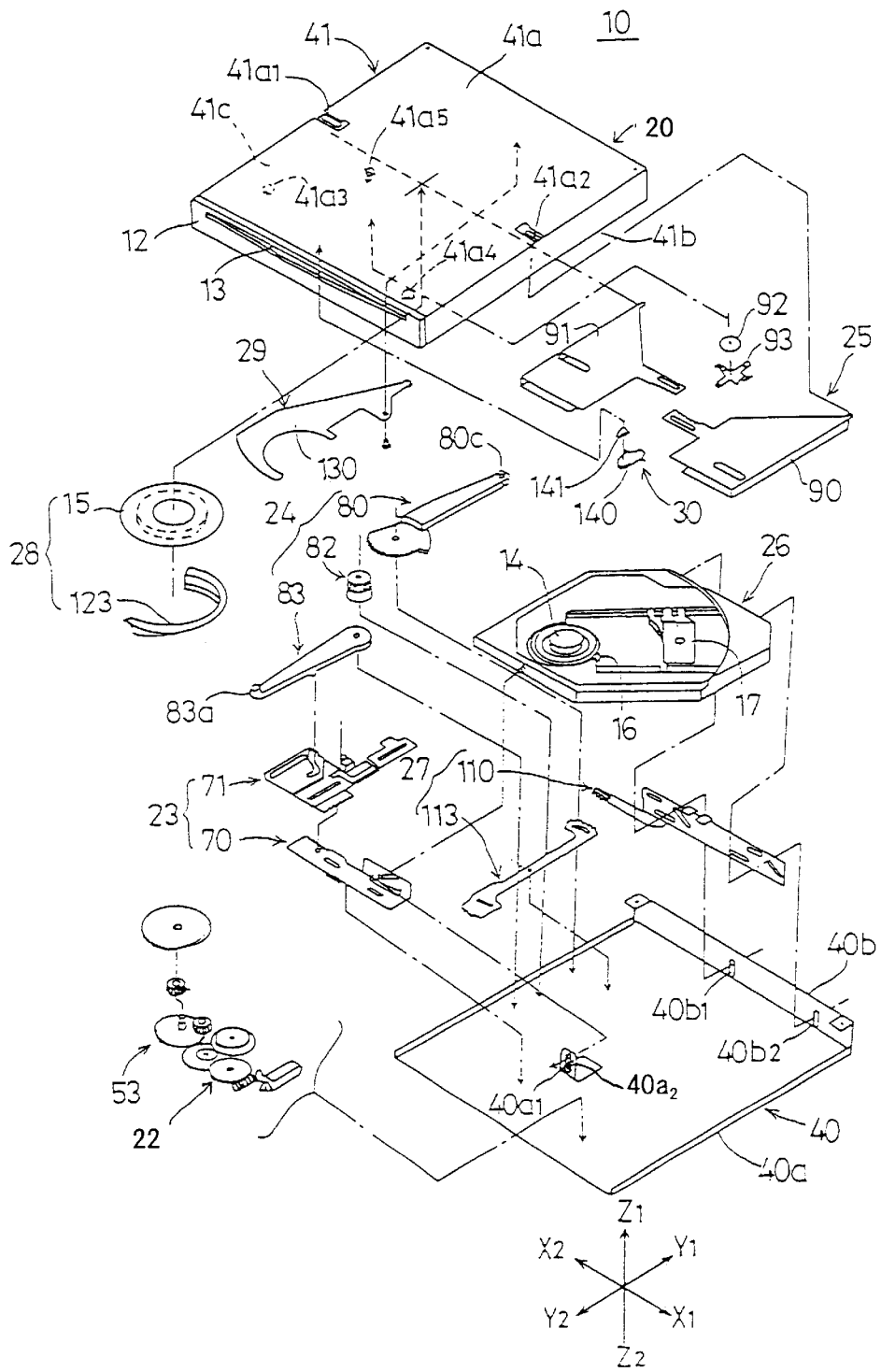
FIG. 2 is an exploded view of the disk loading device shown in FIG. 1.
Figure 3:
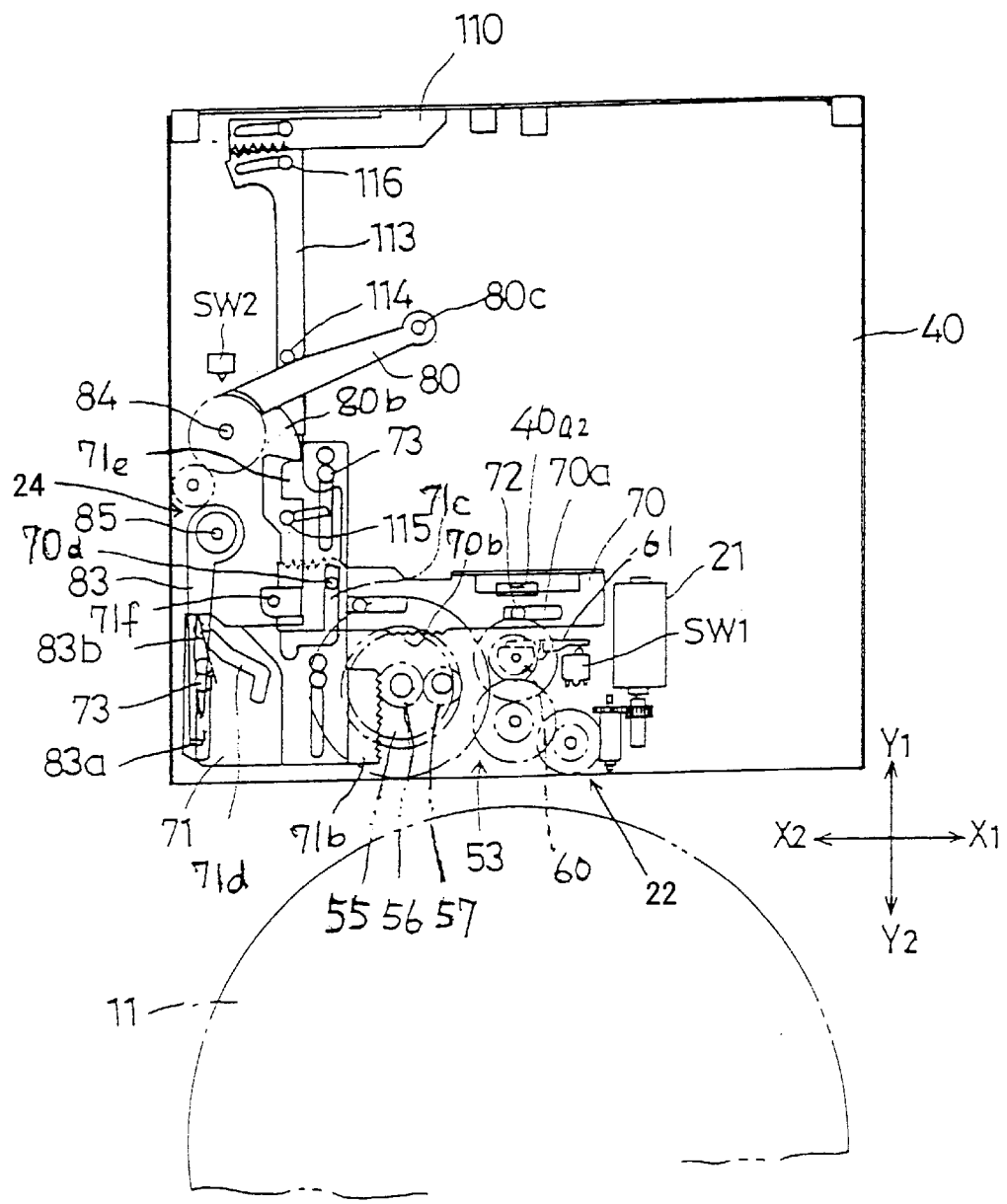
FIG. 3 is a plan view of a mechanism mounted on a base member of the disk loading device shown in FIG. 1.
Figure 4:
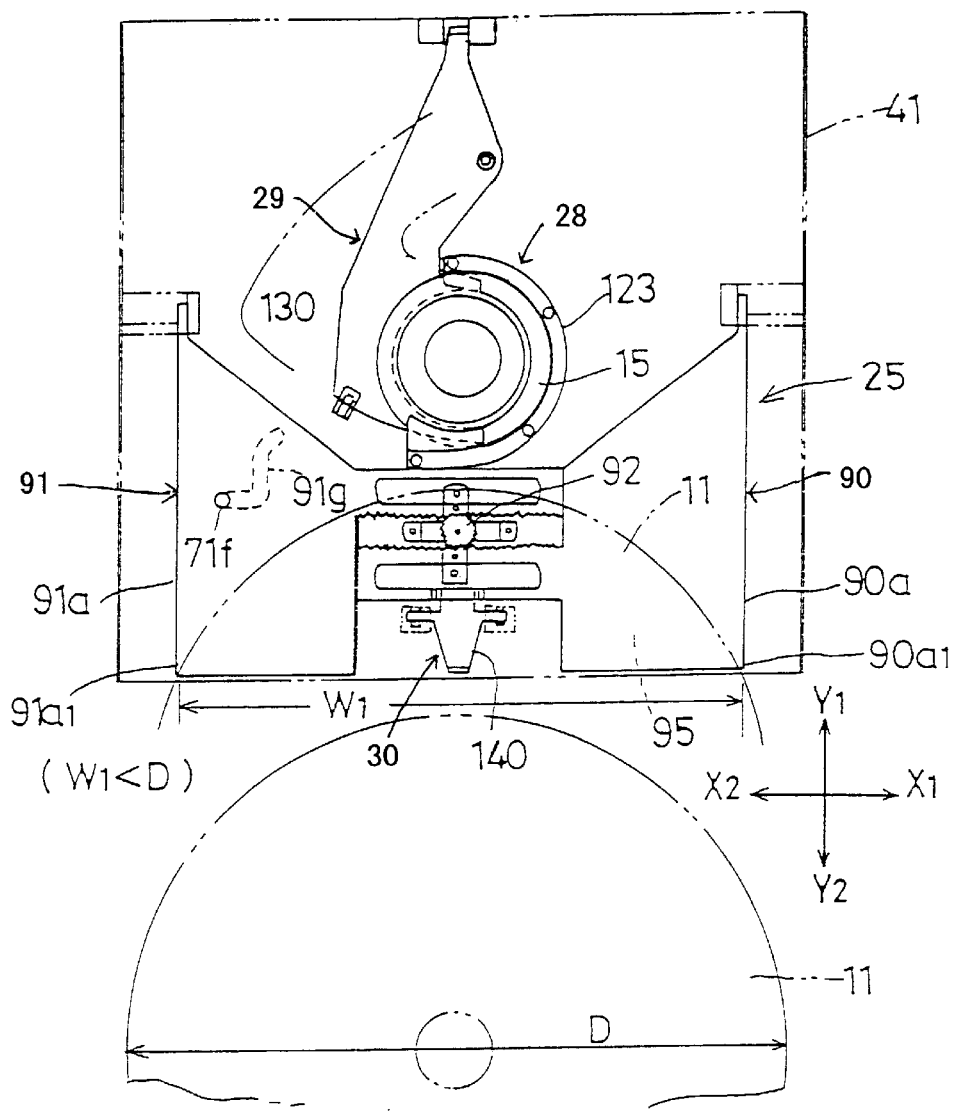
FIG. 4 is a plan view of a mechanism mounted on a bottom surface of a cover member of the disk loading device shown in FIG. 1.
Figure 5:
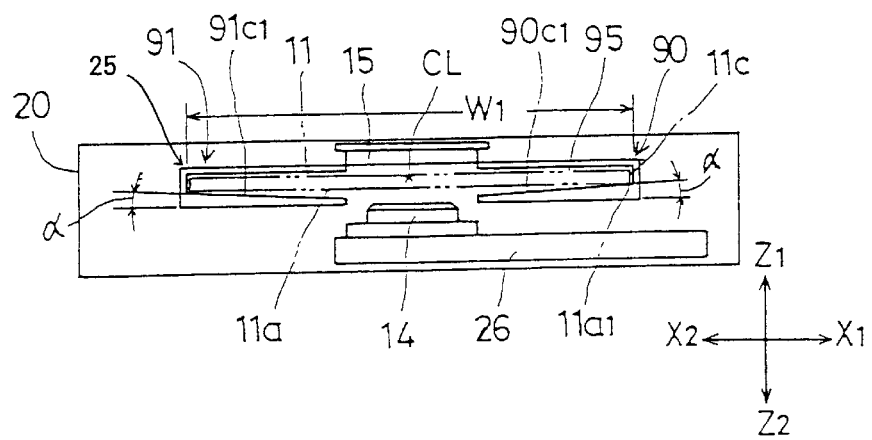
FIG. 5 is a front view of the disk loading device shown in FIG. 1.
Figure 6:
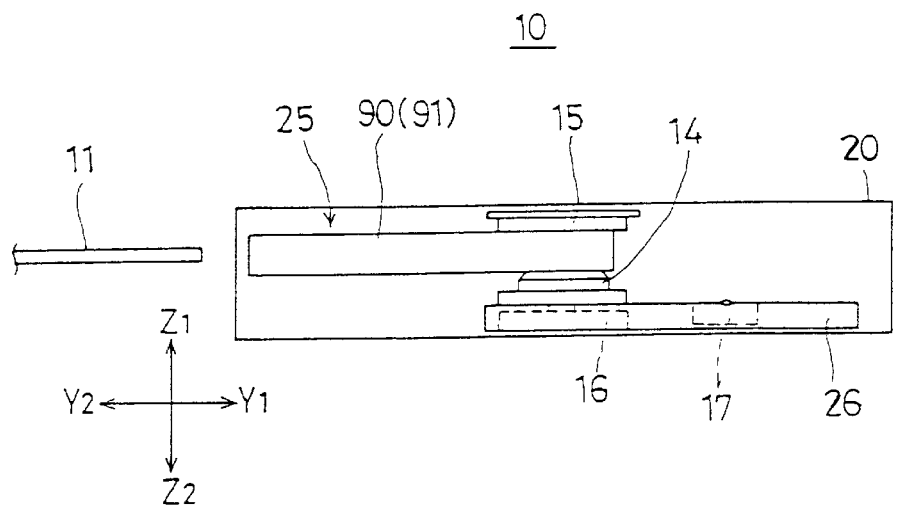
FIG. 6 is a lateral view of the disk loading device shown in FIG. 1.
Figure 7:
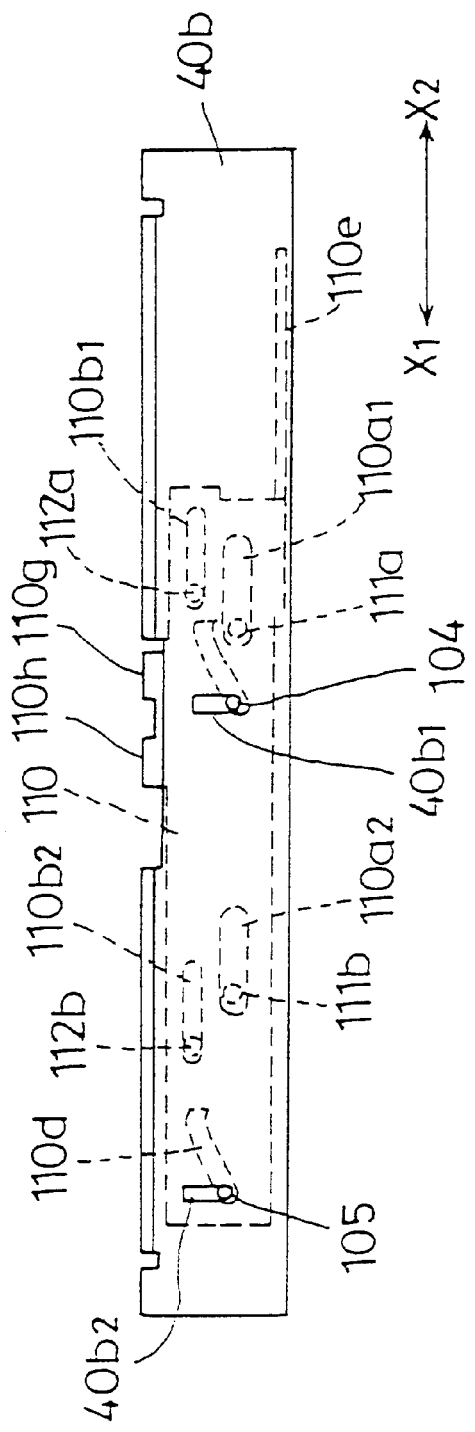
FIG. 7 is a rear view of the disk loading device shown in FIG. 1.
Figure 8A:
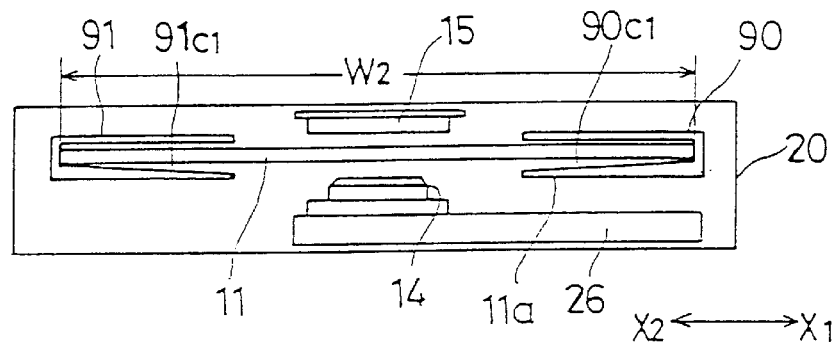
Figure 8B:
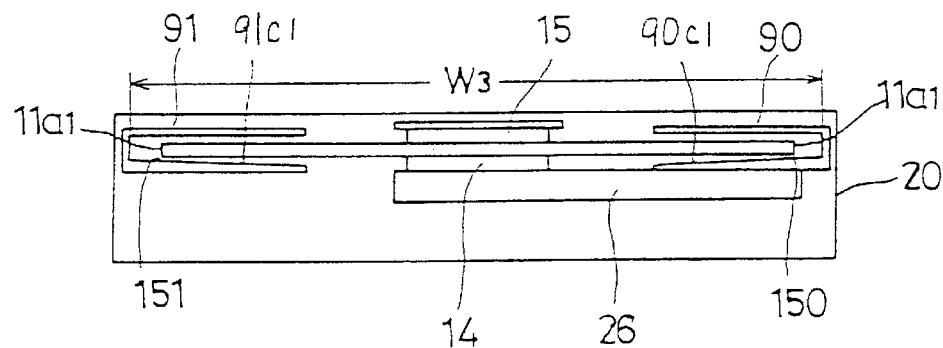
Figure 10:
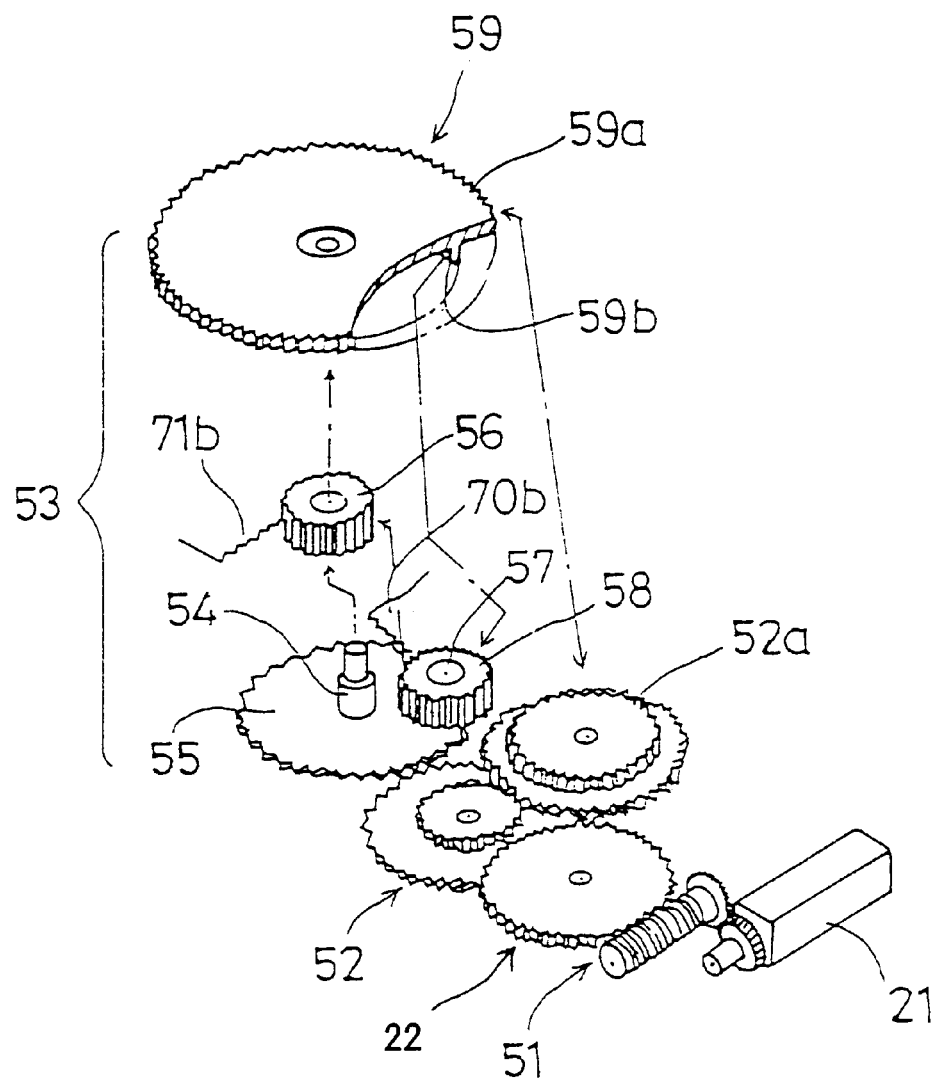
FIG. 10 is an exploded view of a gear mechanism.

FIG. 1 is an perspective transparent view of a disk loading device 10 according to one embodiment of the present invention. FIG. 2 is an exploded view of the disk loading device 10 shown in FIG. 1. FIG. 3 is a plan view of a mechanism mounted on a base member of the disk loading device 10 shown in FIG. 1. FIG. 4 is a plan view of a mechanism mounted on a bottom surface of a cover member of the disk loading device 10 shown in FIG. 1. FIG. 5 is a front view of the disk loading device 10 shown in FIG. 1. FIG. 6 is a lateral view of the disk loading device 10 shown in FIG. 1. FIG. 7 is a rear view of the disk loading device 10 shown in FIG. 1. FIGS. 8A and 8B are front views of the disk loading device 10 shown in FIG. 1 for the purpose of illustrating an operation thereof, in which FIG. 8A shows a state in which disk loading is in progress and FIG. 8B shows a state in which disk loading is completed. FIGS. 9A and 9B are lateral views of the disk loading device 10 shown in FIG. 1 for the purpose of illustrating an operation thereof, in which FIG. 9A shows a state in which disk loading is in progress and FIG. 9B shows a state in which disk loading is completed. FIG. 10 is an exploded view of a gear mechanism.

For ease of explanation, it should be noted that, in all relevant drawings, the X1-X2 axis represents a lateral, that is, a latitudinal direction across the width of the disk loading device 10, the Y1-Y2 axis represents a longitudinal direction front-to-back in the depth direction of the disk loading device 10, and the Z1-Z2 axis represents a vertical direction, that is, the height (thickness) of the disk loading device 10.

In order to facilitate an understanding of the invention, a description will first be given of the operation of the disk loading device 10.

As described above, FIGS. 8A and 8B are front views of the disk loading device 10 shown in FIG. 1 for the purpose of illustrating an operation thereof, in which FIG. 8A shows a state in which disk loading is in progress and FIG. 8B shows a state in which disk loading is completed. FIGS. 9A and 9B are lateral views of the disk loading device 10 shown in FIG. 1 for the purpose of illustrating an operation thereof, in which FIG. 9A shows a state in which disk loading is in progress and FIG. 9B shows a state in which disk loading is completed.

The disk loading device 10 assumes the state shown in FIGS. 8A and 9A when an operator inserts a disk 11, with the recording surface 11a thereof facing downward, into the disk insertion slot 13 of the front bezel 12.

From such a state, the second arm (the push-in arm) 83 pushes the disk 11 inward.

Disk guide/support members 90, 91 then guide the inserted disk 11 and maintain it substantially horizontally.

A turntable 14 then rises to meet and support the inserted disk 11.

A clamper 15 is released, the disk 11 is clamped, the state shown in FIGS. 8B and 9B is entered, and the disk 11 is loaded atop the turntable 14. The second arm 83 and the disk guide/support members 90, 91 then separate from the inserted disk 11 so that the disk 11 may rotate freely.

The turntable motor 16 is activated, the disk 11 is rotated, and information recorded on the disk is reproduced by an optical pick-up 17.

When the operator ejects the disk, the disk loading device 10 operates in the manner described below.

The clamper 15 rises, releasing the clamp on the disk 11. The second arm 83 and the disk guide/support members then support the disk 11 so that the disk 11 does not drop.

The turntable 14 descends, withdrawing from the center-hole 11b in the disk 11.

The disk guide/support members 90, 91 support the disk 11 in a substantially horizontal position.

The first arm (the push-out arm) 80 pushes the disk 11 out of the disk insertion slot 13.

A hook member 140 engages the centerhole 11b of the disk 11 so as to support the disk 11, such that the state shown in FIG. 8A and FIG. 9A is attained.

A description will now be given of the structure of the disk loading device 10.

The disk loading device 10 comprises a frame 20 containing a motor 21, a reduction gear mechanism 22, a plate mechanism 23, a disk push-in/push-out mechanism 24, a disk support/guide mechanism 25, a turntable/optical pick-up unit 26, a turntable/optical pick-up unit elevating and lowering mechanism 27, a clamp mechanism 28, a clamp release mechanism 29, and a disk retention/support mechanism 30.

A description will now be given of each of the individual mechanisms noted above.

The Frame 20

As shown in FIG. 2, the frame 20 comprises a base member 40, a cover member 41, and the front bezel 12.

The base member 40 has a floor plate 40a and a back plate 40b. Guide slots 40a1, 40b1 and 40b2 are formed in the base member 40 to guide the movement of the turntable/optical pick-up unit 26 in the Z1-Z2 direction. More specifically, the guide slot 40a1 is formed on a tab 40a2 cut from the floor plate 40a and bent perpendicular to the floor plate 40a so as to project in the Z1 direction from the floor plate 40a. The guide slots 40b1 and 40b2 are formed in the back plate 40b.

The cover member 41 has a top cover 41a, as well as left and right lateral plates 41b and 41c. Additionally, support portions 41a1 and 41a2 are cut out of the top cover 41a at the edges of the lateral surfaces, with headed pins 41a3 and 41a4 caulked to the top cover 41a as well, all intended to support the disk guide/support member. Additionally, a support 41a5 for supporting a clamper release arm is formed in the top cover 41a.

As shown in FIG. 3, a variety of parts are mounted atop the base member 40. These include the motor 21, the reduction gear mechanism 22, the plate mechanism 23, the disk push-in/push-out mechanism 24, the disk support/guide mechanism 25, the turntable/optical pick-up unit 26, and the turntable/optical pick-up unit elevating and lowering mechanism 27.

As shown in FIG. 4, the cover member 41 mounts the disk support/guide mechanism 25, the clamper 28, the clamper release mechanism 29, and the disk retention/support mechanism 30.

The Motor 21 and Reduction Gear Mechanism 22

As shown in FIG. 3, the motor 21 is fixedly mounted on a top surface of the floor plate 40a. The reduction gear mechanism 22 is also provided on the top surface of the floor plate 40a, and comprises, in order of transmission of rotation, a worm gear 51, a reduction flat gear train 52, 52a and a planetary gear 53 as can be seen in FIG. 10.

The planetary gear mechanism 53 includes a first gear 55 fixedly mounted on a shaft 54, a solar gear 56 rotatably supported atop the shaft 54, a planetary gear 58 rotatable supported by a pin 57 caulked to the first gear 55, and a second gear 59 rotatably supported at an upper distal tip portion of the shaft 54. The planetary gear 58 meshes with the solar gear 56. The second gear 59, as can be seen in FIG. 10, consists of an outer gear 59a and an inner gear 59b integrated into a single unit. The inner gear 59b meshes with the planetary gear 58. The first gear 55 functions as an arm of the planetary gear mechanism 53. A lower proximal tip portion of the shaft 54 is inserted in a hole in the floor plate 40a in such a way as to be freely rotatable therein. The outer gear 59a meshes with the reduction flat gear train 52a.

The first gear 55 meshes with a rack portion 70b of a first slide plate 70. The solar gear 56 meshes with a rack portion 71b of a loading plate 71 to be described later. The rotation of the planetary gear mechanism 53 is restricted by either the solar gear 56 or the first gear 55.

The rotation of the motor 21 is reduced by the worm gear 51 and ultimately by the reduction flat gear train 52, with the reduced rotation transmitted to the second gear 59 of the planetary gear mechanism 53.

The rotation of the second gear 59 is transmitted first to the inner gear 59b, then to the planetary gear 58, and finally to the solar gear 56. With the solar gear 56 in a state of being locked, the planetary gear 58 revolves around the periphery of the solar gear 56 and the first gear 55 is rotated. The planetary gear mechanism 53 thus functions as a reduction gear mechanism. With the first gear 55 in a state of being locked, the position of the planetary gear 58 is fixed and the rotation of the second gear 59 is transmitted first to the planetary gear 58 and then to the solar gear 56, thus rotating the solar gear 56.

As shown in FIG. 3, a cam 60 is formed on the reduction flat gear train 52. The cam 60 oscillates a lever 61 which in turn drives a switch SW1. When the switch SW1 turns ON and OFF a predetermined number of times the motor 21 is stopped.

Plate Mechanism 23

Figure 11:
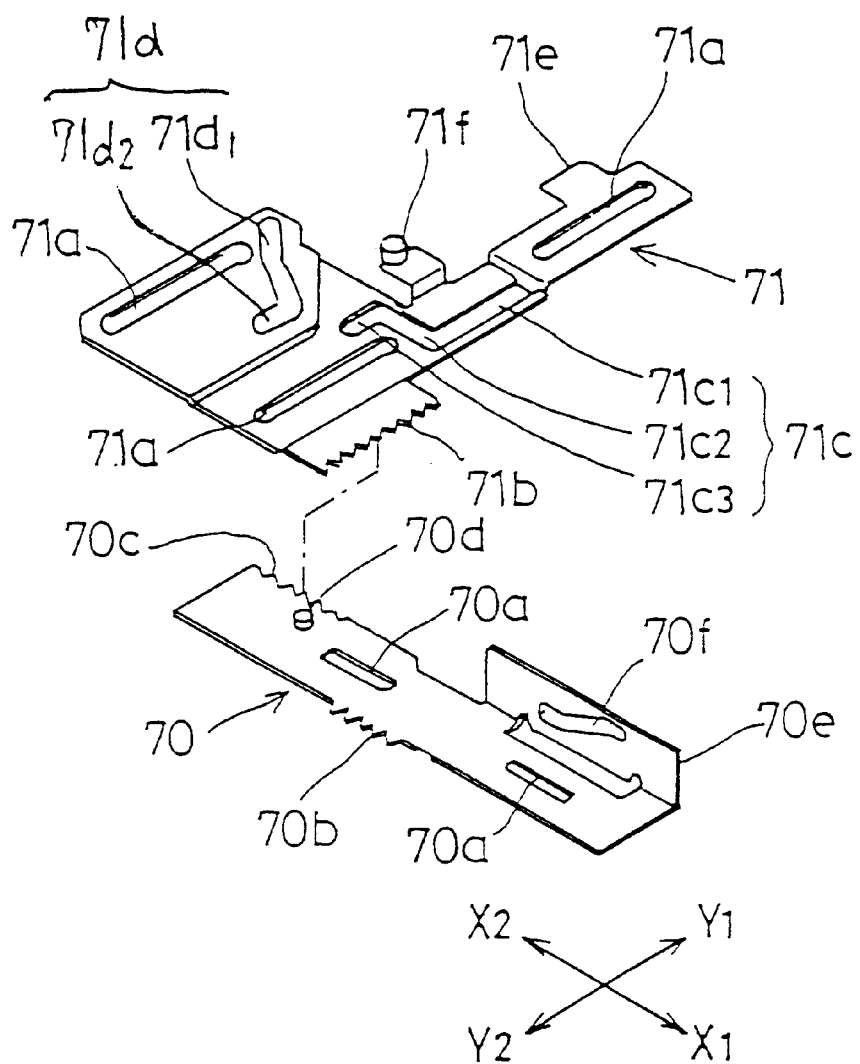
FIG. 11 is an exploded view of a plate mechanism.

FIG. 11 is an exploded view of the plate mechanism 23. As shown in FIGS. 2, 3 and 11, the plate mechanism 23 comprises the first slide plate 70 and the loading plate 71, both mentioned previously.

The first slide plate 70, which slides in the X1-X2 direction by means of two slots 70a engaging a pin 72, has rack portions 70b and 70c and is secured by a pin 70d, and further has a flange portion 70e bent upward in the Z1 direction perpendicular to the main plane of the first slide plate 70. A slanted slit 70f is formed in a central area of the perpendicular flange portion 70e. The rack portion 70b meshes with the first gear 55 of the above-described planetary gear mechanism 53. The rack portion 70c, perpendicular flange portion 70e and slanted slit 70f together form a part of the turntable/optical pick-up unit elevating and lowering mechanism 27.

The loading plate 71, which slides in the Y1-Y2 direction by means of three slots 71a engaging a pin 73, has a rack portion 71b, a step-shaped slit 71c, an L-shaped slit 71d, a lug portion 71e, and a pin 71f. The rack portion 71b meshes with the solar gear 56 of the planetary gear mechanism 53.

The step-shaped slit 71c consists of a longer distal portion 71c1 extending in the Y1-Y2 direction, a central portion 71c2 perpendicular to the first portion 71c1 and extending in the X1-X2 direction, and a shorter proximal portion 71c3 perpendicular to the central portion and extending in the same Y1-Y2 direction as the longer distal portion 71c1. The slit 71c and the pin 70d work together to both restrict and enable both the movement of the first slide plate 70 in the X1-X2 direction and the movement of the loading plate 71 in the Y1-Y2 direction.

A generally L-shaped slit 71d extending generally in a direction intermediate between X1 and Y2 (hereinafter the X1-Y2 direction) comprises a first slit portion 71d1 extending generally in an X1-Y2 direction and a second slit portion 71d2 extending generally in the Y2 direction.

The L-shaped slit 71d and the lug portion 71e engages the disk push-in/push-out mechanism 24. The pin 71f engages the disk guide/support mechanism 25.

Prior to insertion of the disk 11, as shown in FIG. 3 the first slide plate 70 is positioned farther in the X2 direction than it will be after the disk 11 is loaded and the loading plate 71 is positioned farther in the Y2 direction than it will be after the disk 11 is loaded.

Disk Push-in/Push-out Mechanism 24

Figure 12:
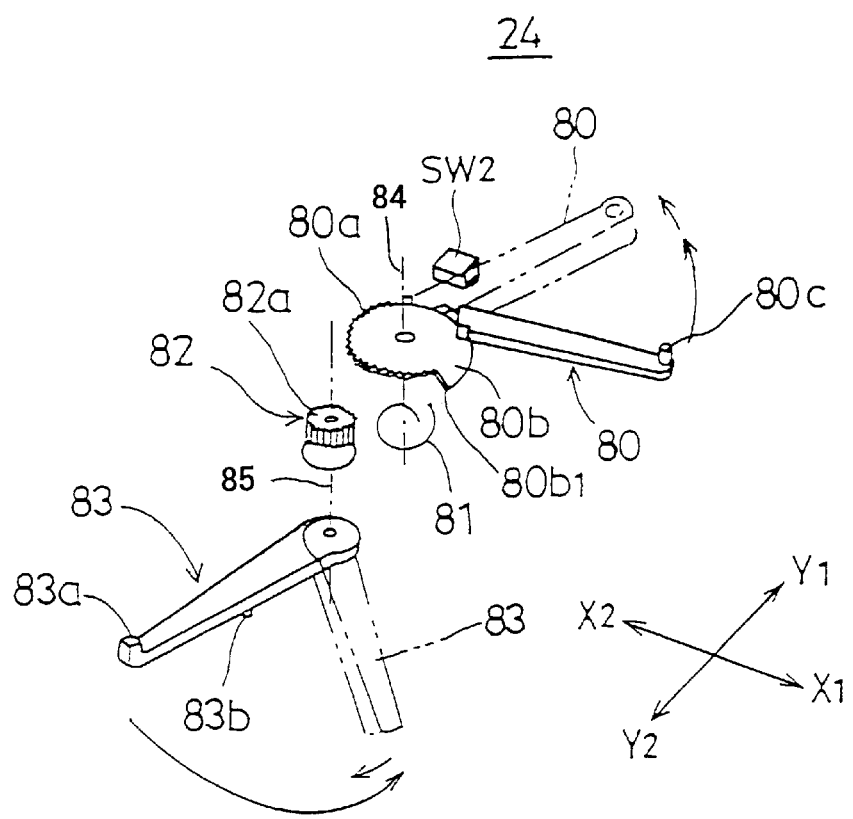
FIG. 12 is an exploded view of a disk push-in/push-out mechanism.

FIG. 12 is an exploded view of the disk push-in/push-out mechanism 24.

As shown in FIG. 1, FIG. 2 and FIG. 3, the disk push-in/push-out mechanism 24 is provided on the top surface of the floor plate 40a, positioned toward the X2 side of the frame 20. As can be seen from FIGS. 1, 2 and 3 together with FIG. 12, the disk push-in/push-out mechanism 24 comprises a first arm 80, a torsion coil spring 81, an oil clamper 82, a second arm 83 and a switch SW2. A shaft portion of the first arm 80 and a shaft portion of the second arm 83 are positioned adjacent to each other, with the shaft portion of the first arm 80 positioned in the Y1 direction with respect to the shaft portion of the second arm 83, and conversely the shaft portion of the second arm 83 positioned in the Y2 direction with respect to the shaft portion of the first arm 80.

The first arm 80 comprises a gear 80a and a cam 80b, with a pin 80c provided on a top surface of a tip portion of the first arm 80 and the whole arm rotatably supported by a shaft 84 caulked to the floor plate 40a, rotatably urged clockwise by the torsion coil spring 81. The first arm 80 is positioned so that, when the disk 11 is inserted, the pin 80c contacts a peripheral portion 11c of the disk 11 on the side of the disk 11 in the direction of insertion of the disk 11. The cam 80b, when the first arm 80 is rotated in a counter-clockwise direction, triggers a switch SW2. The gear 80a meshes with a gear part 82a of the oil clamper 82 fixedly mounted on the floor plate 40a.

A tip portion 80b1 of the cam 80b contacts the lug portion 71e of the loading plate 71, with the rotational position of the first arm 80 being determined by the position of the loading plate 71.

The second arm 83 includes an upper projection 83a provided at a top surface of a tip thereof which projects upward in the Z1 direction and a pin-like lower projection 83b provided at an intermediate position on a bottom surface thereof which projects downward in the Z2 direction, the whole arm being rotatably supported by a shaft 85 caulked to the floor plate 40a, and thus disposed atop the loading plate 71.

The upper projection 83a is positioned at a height corresponding to the height of the peripheral portion 11c of the disk 11 on the side of the disk 11 in the direction of insertion of the disk 11. The pin-like lower projection 83b engages the slit 71d in the loading plate 71 and the second arm 83 rotates in response to the movement of the loading plate 71, with the rotational position of the second arm 83 being determined by the position of the loading plate 71. That is, the position of the loading plate 71 determines the rotational positions of both the first arm 80 and the second arm 81.

Prior to the insertion of the disk 11, as shown in FIG. 3 the first arm 80 points toward the X1 direction and the second arm 83 points toward the Y2 direction.

The upper projection 83a is disposed so as not to interfere with the insertion of the disk 11, while the pin 80c projects into the path of the inserted disk 11.

Additionally and importantly, the first arm 80 and the second arm 83 both rotate within the X-Y plane. That is, during loading and during unloading the first arm 80 and the second arm 83 both rotate within a plane parallel to the plane formed by the path of transit of the disk 11. The result is that the disk loading device 10 can be made slimmer than the conventional art, with its use of rollers, would allow.

Disk Support/Guide Mechanism 25

Figure 13:
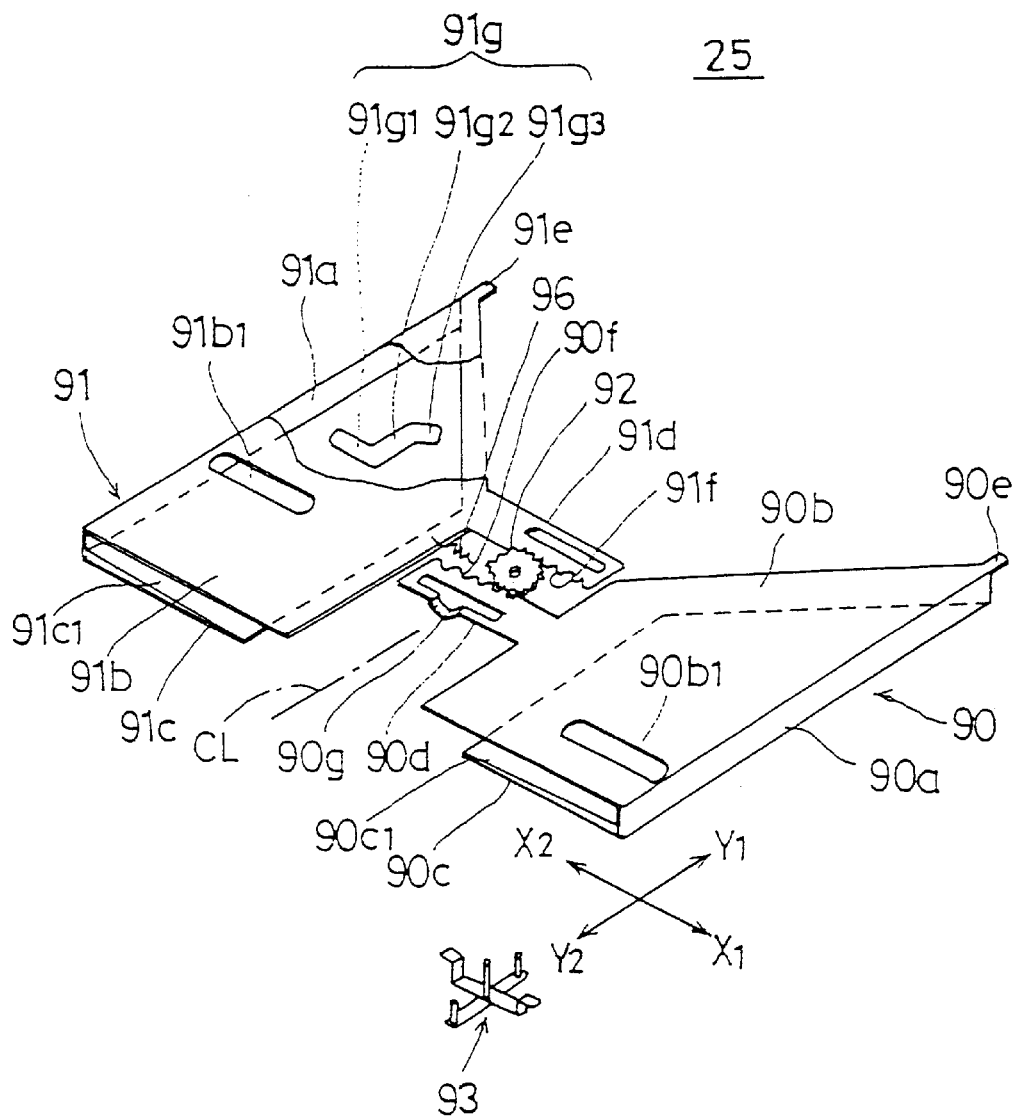
FIG. 13 is an perspective view of a disk support/guide mechanism.

FIG. 13 is an perspective view of the disk support/guide mechanism 25.

As shown in FIGS. 1, 2, 4, 5, 6 and 13, the disk support/guide mechanism 25 comprises an X1-side disk support/guide member 90, an X2-side disk support/guide member 91 and a pinion 92.

The X1-side disk support/guide member 90 is shaped substantially like the letter "C" in cross-section, and comprises an X1-side lateral plate portion 90a that guides the disk 11, an upper plate portion 90b in which a slit 90b1 is formed, a lower plate portion 90c that supports the disk 11, an arm portion 90d that extends from the upper plate portion 90b in the X2 direction, and a lug 90e that projects from the upper plate portion 90b in the Y1 direction.

Similarly, the X2-side disk support/guide member 91 is shaped substantially like the letter "C" in cross-section, and comprises an X2-side lateral plate portion 91a that guides the disk 11, an upper plate portion 91b in which a slit 91b1 is formed, a lower plate portion 91c that supports the disk 11, an arm portion 91d that extends from the upper plate portion 91b in the X1 direction, a lug 91e that projects from the upper plate portion 91b in the Y1 direction. A rack 91f is formed in the arm portion 91d. A substantially L-shaped slit 91g is formed in the lower plate 91c. The slit 91g comprises slit portion 91g1 extending in the X1 direction, slit portion 91g2 extending in the Y1 direction, and slit portion 91g3 extending in a direction intermediate between the X1 direction and the Y1 direction.

The X1-side disk support/guide member 90 is supported at the slit 90b1 by the headed pin 41a4 described above and at the lug 90e by the support portion 41a2, in such a way as to be movable in the X1-X2 axis below the top cover 41a. Similarly, the X2-side disk support/guide member 91 is likewise supported at the slit 91b1 by the headed pin 41a3 at the lug 91e by the support 41a1, in such a way as to be movable in the X1-X2 axis below the top cover 41a.

The lower plate portions 90c, 91c of the X1-side disk support/guide member 90 and the X2-side disk support/guide member 91, respectively, have (on their respective upper surfaces) disk supporting surfaces 90c1 and 91c1, respectively, that support the disk 11. As shown in FIG. 5, the disk supporting surfaces 90c1 and 91c1 are inclined surfaces, that is, slanted so as to be at their lowest about a center line indicated as CL in FIG. 5 and in FIG. 13 and highest at the lateral plate portions 90a and 91a. The angle of inclination of the slanted disk support surfaces 90c1 and 91c1 is indicated as alpha in FIG. 5. The reason for making the disk support surfaces 90c1 and 91c1 slanted is to avoid damaging the recording surface 11a of the supported disk 11.

Additionally, a rack 90f and the rack 91f are disposed so as to be opposite each other, and mesh with the pinion 92 mounted on the cross-like member 93 on the lower surface of the top cover 41a. Thus the X1-side disk support/guide member 90 and the X2-side disk support/guide member 91 are linked to each other and move equal distances in opposite directions with respect to each other, always maintaining the same symmetrical relationship with respect to the center line. Additionally, a coil spring 96 urges the X2 disk support/guide member 91 in the X1 direction.

The opposed X1-side disk support/guide member 90 and the X2-side disk support/guide member 91 form a partially enclosed substantially planar space 95 for accommodating an inserted disk 11. This enclosed space 95 changes a width in the X1-X2 direction, expanding and contracting as the disk support/guide members 90 and 91 draw apart from or closer to each other, as the case may be.

Turntable/Optical Pick-up Unit 26

Figure 14:
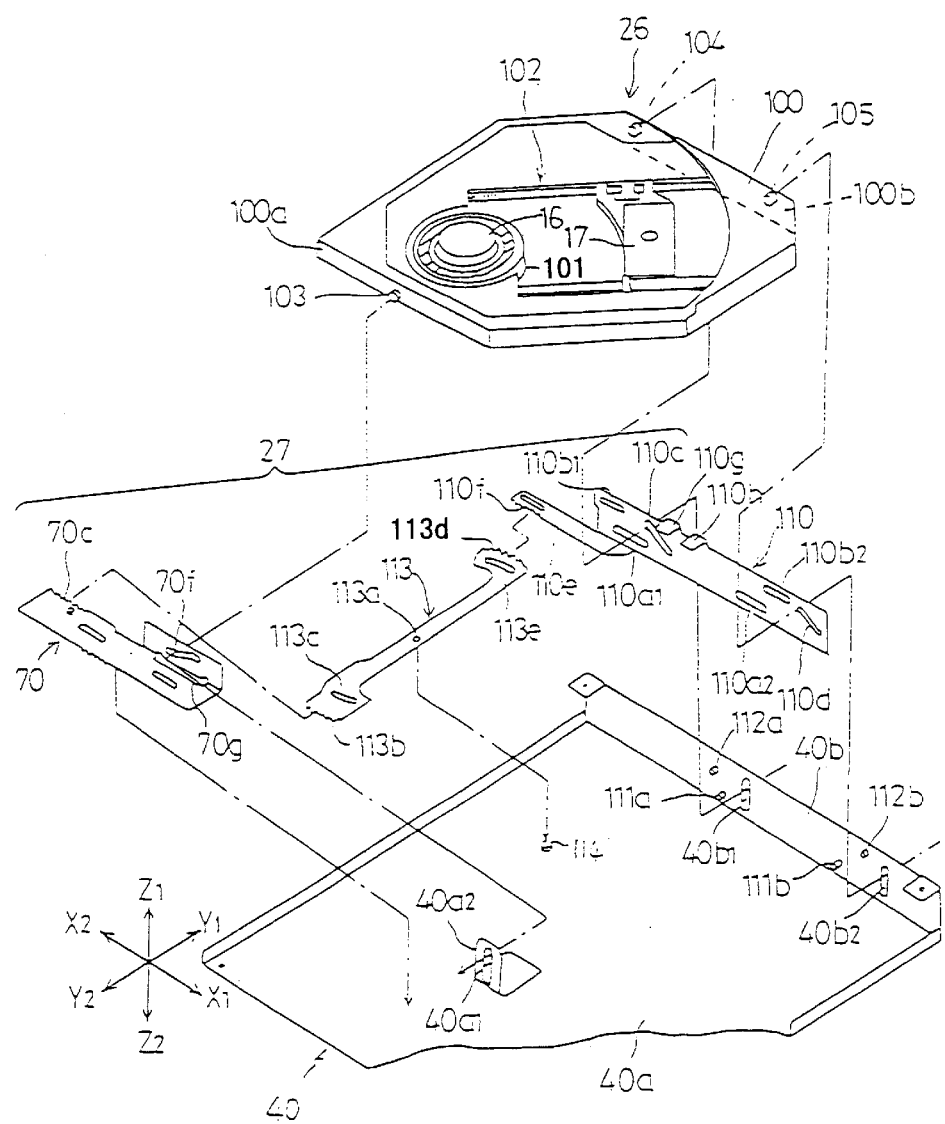
FIG. 14 is an perspective view of a turntable/optical pick-up unit elevating and lowering mechanism.

FIG. 14 is an perspective view of a turntable/optical pick-up unit elevating and lowering mechanism.

As shown in FIGS. 1, 2, 5, 6 and 14, the turntable/optical pick-up unit 26 is substantially planar in shape, and comprises a substantially planar housing 100, the turntable 14, an optical pick-up 17, a turntable motor 101, and an optical pick-up feed mechanism 102. A first pin 103 projects from a Y2-side lateral surface 100a of the housing 100, and second and third pins 104, 105, respectively, project from a Y1-side lateral surface 100b of the housing 100.

The turntable/optical pick-up unit 26 causes the first pin 103 to engage the guide slot 40a1 formed on the tab 40a2 cut from the floor plate 40a, and similarly causes the second and third pins 104, 105 to engage guide slots 40b1, 40b2, respectively formed in the back plate 40b of the base member 40. The turntable/optical pick-up unit 26 is thus positioned atop the top surface of the base member 40, and supported thereby so as to be movable in the Z1-Z2 direction.

Turntable/Optical Pick-up Unit Elevating and Lowering Mechanism 27

FIG. 14 is an perspective view of a turntable/optical pick-up unit elevating and lowering mechanism 27.

As shown in FIGS. 1, 2, 3, 7 and 14, the turntable/optical pick-up unit elevating and lowering mechanism 27 comprises the first slide plate 70 (refer to FIG. 11), a second slide plate 110 and a linkage lever 113, all provided on the top surface of the base member 40. The turntable/optical pick-up unit 26 is normally positioned lowered to a lower position in the Z2 direction.

A slit 70g engages the first slide plate 70 tab 40a2 cut from the floor plate 40a, with the slanted slit 70f noted previously disposed opposite the guide groove 40a.

The second slide plate 110, as shown in FIG. 7, has four slots 110a1, 110a2, 110b1 and 110b2 that engage pins 111a, 111b, 112a and 112b provided on the back plate 40b of the base member 40, so as to be slidable in the X1-X2 direction in a plane parallel to the inner surface of the back plate 40b. Slanted slits 110c and 110d are further formed in the second slide plate 110, with slanted slit 110c disposed opposite guide slot 40b1 and slanted slit 110d disposed opposite slanted slot 40b2. The direction of slant of the slanted slit 70f noted above is the opposite of the direction of slant of the slanted slits 110c, 110d.

The second slide plate 110 is further provided with a horizontal arm 110e at the X2-side edge thereof that is parallel to the top surface of the floor plate 40a, with a rack portion 110f formed on the X2 edge of the horizontal arm 110e.

Additionally, the second slide plate 110 further provided with a pair of lugs 110g and 110h that have to do with the clamp release mechanism 29, as is explained below.

The linkage lever 113 is rotatably mounted on the top surface of the floor plate 40a by a central pin 114 provided on the floor plate 40a and engaging a hole 113a formed at substantially a central position of the linkage lever 113. A first pinion portion 113b and a first slit 113c is provided on a proximal Y2-side edge of the linkage lever 113. A second pinion portion 113d and a second slit 113e is provided on a distal Y1-side edge of the linkage lever 113. The first pinion portion 113b and the second pinion portion 113d, and the first slit 113c and the second slit 113e, are formed so as to describe an arc with respect to the above-noted central pin 114. The first pinion portion 113b engages the rack portion 70c of the first slide plate 70 which slides in the X1-X2 direction by means of two slots 70a engaging a pin 72. The second pinion portion 113d engages the rack portion 110f of the second slide plate 110.

Accordingly, the first slide plate 70 and the second slide plate 110 and the linkage lever 113 are disposed so that, when the first slide plate 70 slides in the X2 direction, the linkage lever 113 is rotated in the clockwise direction via the rack portion 70c and the first pinion portion 113b and the first slide plate 70 slides in the X1 direction via the second pinion portion 113d and rack portion 110f. When conversely the first slide plate 70 slides in the X1 direction, the linkage lever 113 is rotated in the counter-clockwise direction and the second slide plate 110 slides in the X2 direction.

It should be noted that, as shown in FIG. 3, two pins 115 and 116 caulked to the floor plate 40a of the base member 40 engage the edges of the first slit 113c and the second slit 113e so as to keep the first pinion portion 113b and the second pinion portion 113d from floating free of the floor plate 40a, thus securing the engagement of the first pinion portion 113b with the rack portion 70c and the second pinion portion 113d with the rack portion 110f.

The first pin 103 projecting from the Y2-side lateral surface 100a of the housing 100 engages the slanted slit 70f and the guide slot 40a1, the second pin 104 projecting from the Y1-side lateral surface 100b of the housing 100 engages the slanted slit 110c formed in the second slide plate 110 and the guide slot 40b1, and the third pin 105 projecting from the Y1-side lateral surface 100b of the housing 100 engages the slanted slit 10d formed in the second slide plate 110 and guide slot 40b2.

As a result, when the first slide plate 70 slides in the X2 direction, the second slide plate 110 slides in the X1 direction via the linkage lever 113 and the slanted slits 70f, 110c and 110d each push the first, second and third pins 103, 104 and 105 upward, thus raising the turntable/optical pick-up unit 26 in the Z1 direction. Conversely, when the first slide plate 70 slides in the X1 direction, the second slide plate 110 slides in the X2 direction via the linkage lever 113 and the slanted slits 70f, 110c and 110d each push the first, second and third pins 103, 104 and 105 downward, thus lowering the turntable/optical pick-up unit 26 in the Z2 direction.

The linkage lever 113 and the first slide plate 70 and the second slide plate 110 are disposed separately and horizontally above the surface of the floor plate 40a but do not overlap. Accordingly, the optical pick-up unit elevating and lowering mechanism 27 gains no added height but remains slim.

Clamp Mechanism 28

Figure 15:
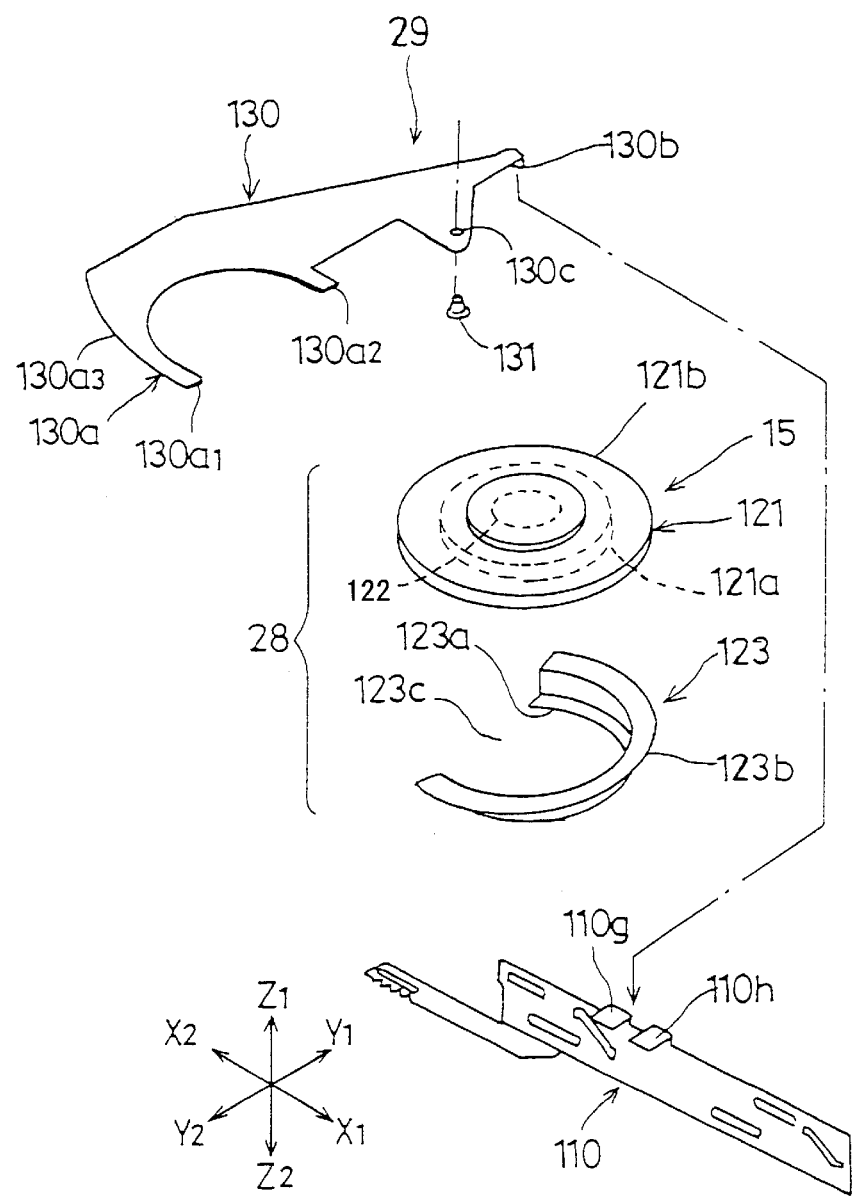
FIG. 15 is an exploded view of a clamp mechanism and a clamp release mechanism.
Figure 16A:
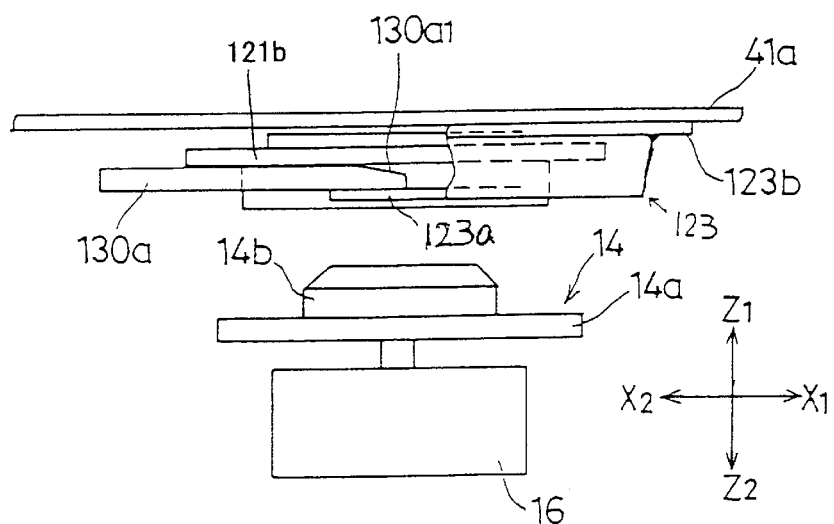
FIGS. 16A and 16B show the clamp mechanism in a clamp release state and a clamp release mechanism, respectively.
Figure 16B:
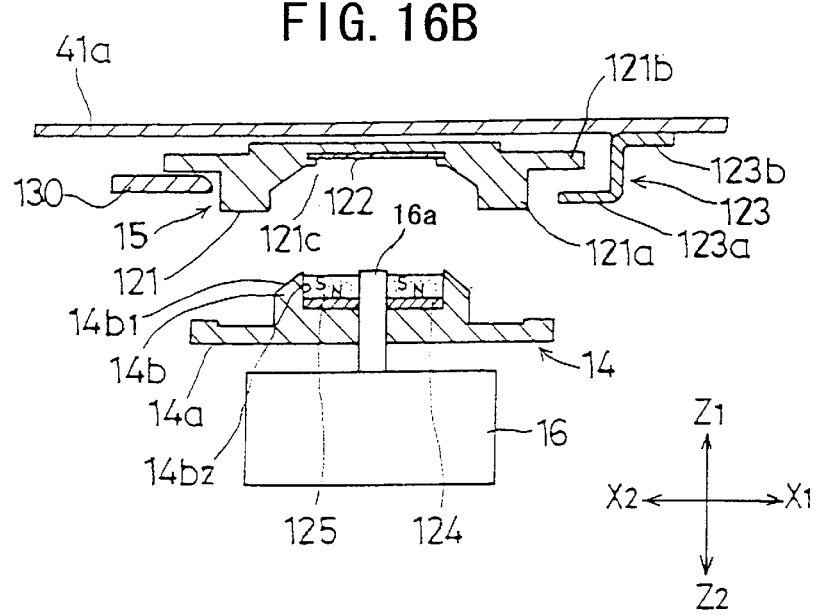
Figure 24:
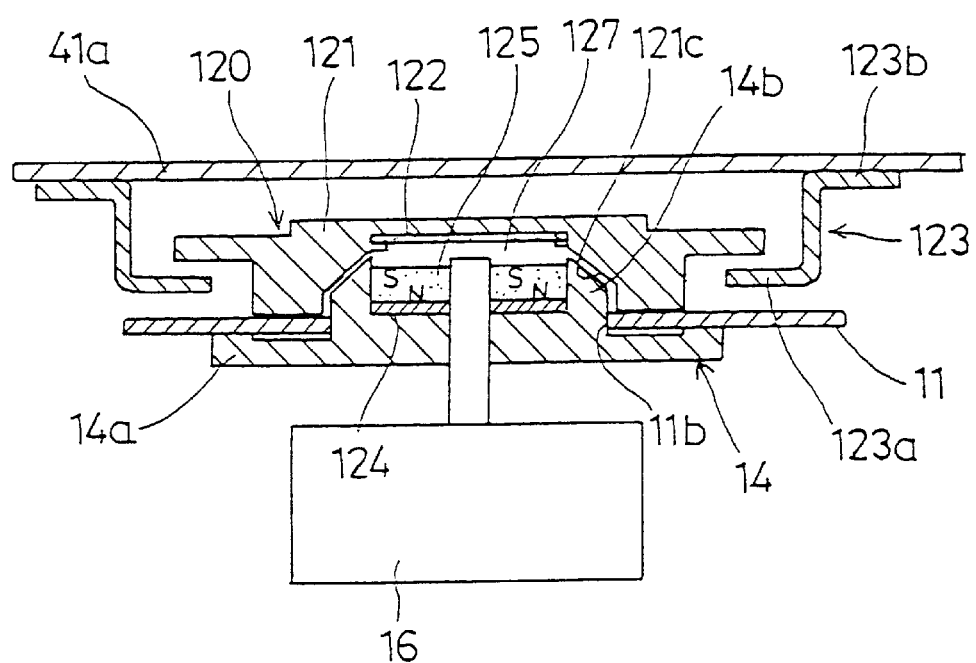
FIG. 24 is a lateral view of the clamp mechanism in a state of clamping the disk.

FIG. 15 is an exploded view of a clamp mechanism and a clamp release mechanism. FIGS. 16A and 16B show the clamp mechanism in a clamp release state and a clamp release mechanism, respectively. FIG. 24 is a lateral view of the clamp mechanism in a state of clamping the disk.

As shown in FIG. 4, 6, 15, 16A and 16B, the clamp mechanism 28 comprises a clamper 15, a clamper support member 123, and the turntable 14. As noted above, FIGS. 16A and 16B show the clamp mechanism in a clamp release state and a clamp release mechanism, respectively. FIG. 24 is a lateral view of the clamp mechanism in a state of clamping the disk.

As shown in FIG. 16B, the clamper 15 comprises a circular metal plate member 122 insert-molded into a center of a synthetic resin body 121. The clamper body 121 in turn comprises a clamp 121a that contacts the disk 11 and a flange 121b positioned outboard the clamp 121a. An upwardly concave well-shaped portion 121c is formed in the center of the clamper body 121, with the circular metal plate member 122 located at the top of the well and exposed to the opening at the bottom of the well.

The half-ring shaped clamper support member 123 with a substantially S-shaped cross-section, and comprises an inner flange 123a and an outer flange 123b which is also a mounting portion that mounts the clamper support member 123 to the bottom surface of the top cover 41a. As shown in FIG. 4, out of consideration for the positioning of a clamp release member 130 to be described later, the clamper support member 123 is mounted so that the opening 123c faces in the X2 direction, with the arm-like fork portion 130a of the clamp release member 130 disposed opposite the opening 123c.

As shown in FIGS. 16A and 16B, the turntable 14 includes a peripheral flange 14a and a central projecting hub 14b. The central projecting hub 14b further has a slanted shoulder 14b1 and a central well-like concave portion 14b2 open in the Z1 direction. The central well-like concave portion 14b2 contains an annular yoke 124 as well as a permanent magnet magnetized in the direction of the thickness of the magnet that is fitted to a spindle 16a of the motor 16.

In an initial position, the clamp mechanism 28 is disposed as shown in FIGS. 16A and 16B. The clamp release member 130 is fitted within the clamper support member 123. The clamper 15 is surrounded by the clamper support member 123 and the U-shaped arm-like fork portion 130a of the clamp release member 130 so as to prevent the clamper 15 from falling out of the clamp support member 123. Further, the flange 121b positioned outboard the clamp 121a is supported by the fork portion 130a to be displaced in the Z1 direction. The turntable 14 is lowered to a lower position.

As will be described later, when the disk 11 is pushed into the device and the first slide plate 70 and the second slide plate 110 slide, the clamp release member 130 rotates in the clockwise direction as shown by the double-dotted-and-dashed line in FIG. 4 and disengages from the clamp support member 123 and the turntable 14 rises in the Z1 direction.

When the turntable rises in the Z1 direction, the central hub 14b engages the centerhole 11b in the disk 11 so as to position the disk 11, and the flange 14a supports the disk 11 from below at the periphery of the centerhole 11b. When the clamp release member 130 disengages from the clamper support member 123, the clamper 15 is released from support by the fork portion 130a, displaces in the Z2 direction, and the circular metal plate member 122 inserted into the center of the synthetic resin body 121 of the clamper 15 is attracted by the permanent magnet 125. As shown in FIG. 24, the clamper 15 is magnetically attracted to the turntable 14 and clamps the disk 11 at the periphery of the centerhole 11b, on the top surface of the disk 11d, thus clamping the disk 11 atop the turntable 14. It should be noted that a gap 127 exists between the circular metal plate member 122 and the permanent magnet 125.

With the clamp mechanism 28 in a state prior to clamping as shown in FIG. 16A and 16B, with the disk 11 in a state prior to being clamped, the magnetic force of the permanent magnet 125 is such as to attract and position the circular metal plate member 122 atop the center of the permanent magnet 125. Accordingly, the clamper 15 is drawn to and centered atop the center of the turntable 14. As a result, when the disk 11 is clamped atop the turntable 14, the engagement of the upwardly concave well-shaped portion 123c if the clamper 15 with the central projecting hub 14b of the turntable 14 is smooth and secure.

Clamp Release Mechanism 29

As shown in FIGS. 2, 4, 15, 16A and 16B, the clamp mechanism 28 comprises the clamp release member 130 and the second slide plate 110.

As noted previously, the clamp release mechanism 130 includes a U-shaped fork portion 130a at a first end and a lug 130b bent downward in the Z2 direction at a second end. The fork portion 130a is of a size calculated to reach the interior of the clamper support member 123 from a lateral direction, and further, has beveled tip portions 130a1, 130a2.

The clamp release member 130 is supported at a hole 130c offset from center in the direction of the lug 130b by a pin 131 provided on the top cover 41a of the cover member 41. Additionally, an edge of the fork portion 130a indicated by reference numeral 130a3 in FIG. 15 is supported by the support 41a5 formed in the top cover 41a, and is thus supported on the lower surface of the top cover 41a. The lug 130b is engaged between the pair of lugs 110g and 110h of the second slide plate 110. Accordingly, the clamp release mechanism 130 rotates in a plane parallel to the underside of the top cover 41a in response to the movement of the second slide plate 110 in the X1-X2 direction.

As shown in FIG. 24, when the disk 11 is clamped magnetically to the turntable 14 by the clamper 15 and a disk eject command is received, then the second slide plate 110 moves in the X2 direction, the clamp release member 130 rotates in the counter-clockwise direction, the fork portion 130a enters the clamper support member 123 and gets between the flange 123a and the flange 121b, lifting the flange 121b. The magnetic force pressing the clamper 15 to the turntable 14 is released, the clamper 15 is released from the turntable 14 and the clamp on the disk 11 is released.

The clamper support member 123 is fixedly mounted on the underside of the top cover 41a of the cover member 41. The clamp release member 130 moves parallel to the underside of the cover part 41a, so the clamp release mechanism 29 can be made slim.

Disk Retention/Support Mechanism 30

Figure 17:
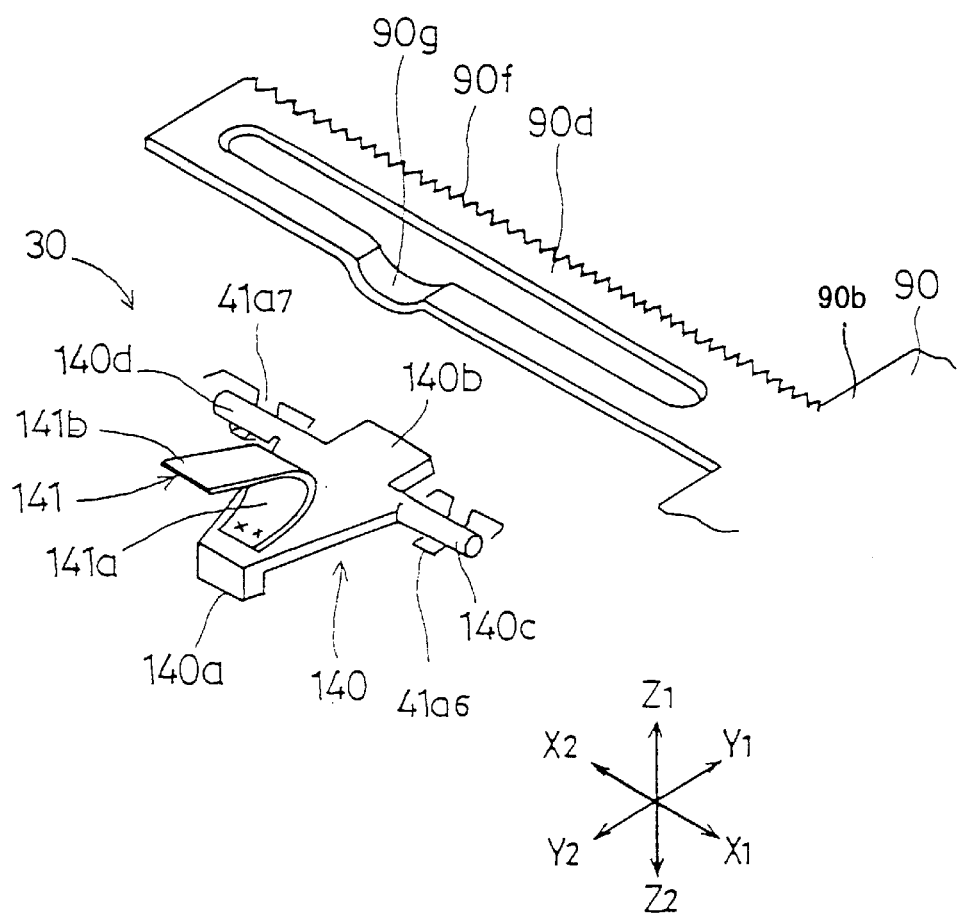
FIG. 17 is an perspective exploded view of a disk retention/support mechanism.
Figure 18A:
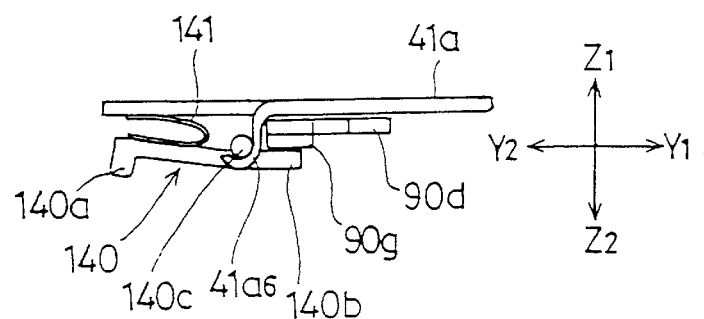
FIGS. 18A and 18B are lateral views of the disk retention/support mechanism in a closed state and in an open state, respectively.
Figure 18B:
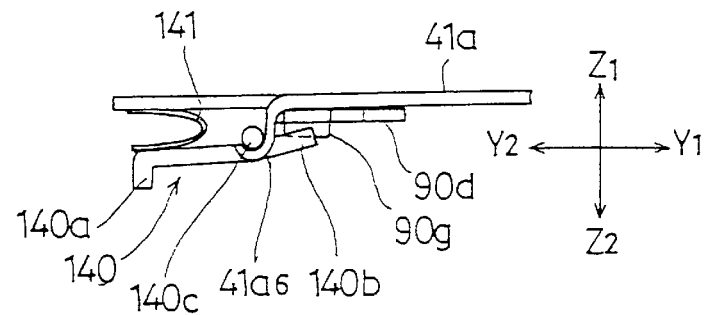

FIG. 17 is an perspective exploded view of a disk retention support mechanism. FIGS. 18A and 18B are lateral views of the disk retention support mechanism in a closed state and in an open state, respectively.

As shown in FIG. 2, FIG. 4. FIG. 17, FIG. 18A and FIG. 18B, the disk retention/support mechanism 30 comprises a hook member 140, a U-shaped leaf spring 141, and a portion of the X1-side disk support/guide member 90, and is mounted on the lower surface of the cover portion 41a of the cover member 41.

The hook member 140 has at a first end a hook 140a for hooking onto an edge of the centerhole 11b of the disk 11 and at a second end an arm portion 140b. A shaft portion extends through a middle portion of the hook member 140, with ends on both sides at 140c and 140d. One end 141a of the U-shaped leaf spring 141 is fixedly mounted on an upper surface of the hook member 140.

The arm portion 140b on the Y1 side of the hook member 140 contacts the lower surface of the arm portion 90d that extends from the upper plate portion 90b of the X1-side disk support/guide member 90. A stepped portion 90g is formed in the arm portion 90d projects in the Z2 direction from the arm portion 90d.

In an initial state, the stepped portion 90g contacts the arm portion 140b and the hook member 140, as shown in FIG. 18A, is in a substantially horizontal state, with the hook 140a facing upward in the Z1 direction, and withdrawn above the path of transit of the disk 11.

When the X1-side disk support/guide member 90 moves in the X1 direction, the stepped portion 90g separates from the arm portion 140b and the hook member 140, as shown in FIG. 18B, is rotatably inclined in the counter-clockwise direction about the shaft portion 140c by the leaf spring member 141, with the hook 140a facing downward in the Z2 direction and projecting into the path of transit of the disk 11, thus making it possible to retain the disk 11 by the disk centerhole 11b.

Figure 26A:
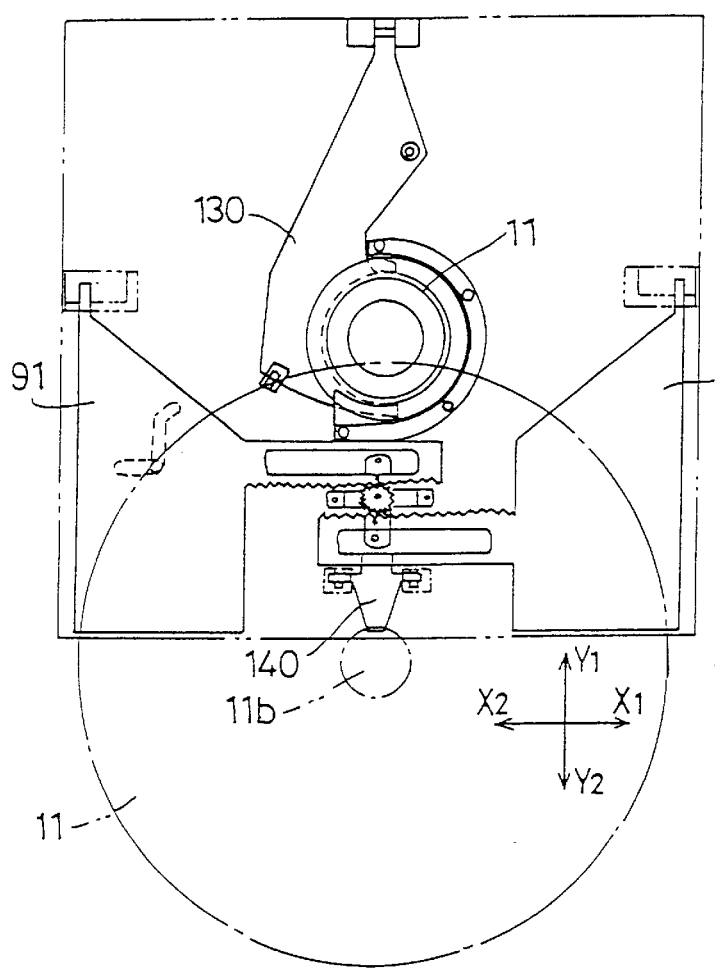
FIGS. 26A and 26B show plan and lateral views, respectively, of a state in which disk unloading is completed.
Figure 26B:
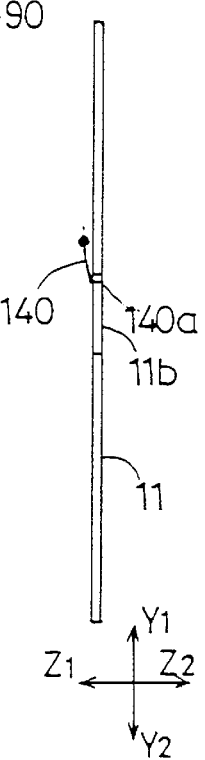

FIGS. 26A and 26B show plan and lateral views, respectively, of a state in which disk unloading is completed.

The above-described disk retention/support mechanism 30, as shown in FIGS. 26A and 26B, is positioned so that the hook 140a of the hook member 140 engages the centerhole 11b of the disk 11 in a state in which approximately three-fourths of the centerhole 11b comes out and is externally exposed from the disk insertion slot 13 in the front bezel 12.

The foregoing describes the various mechanisms that together form the disk loading device 10.

Next a description will be given of the operation of each of the various mechanisms described above when the disk 11 is loaded in to the apparatus.

Figure 19:
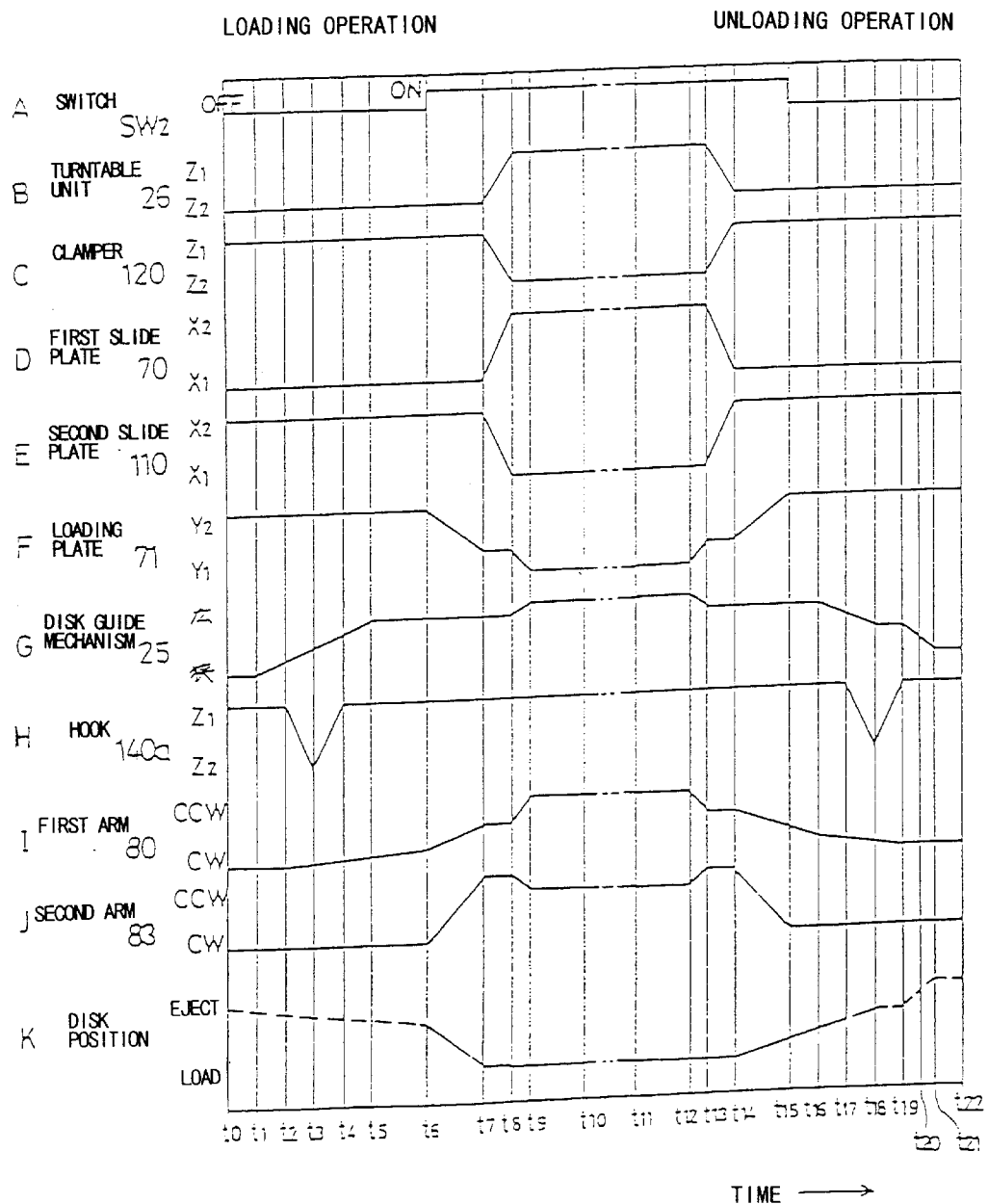
FIG. 19 is a timing chart showing the operations of individual mechanisms during disk loading and disk unloading.
Figure 20:
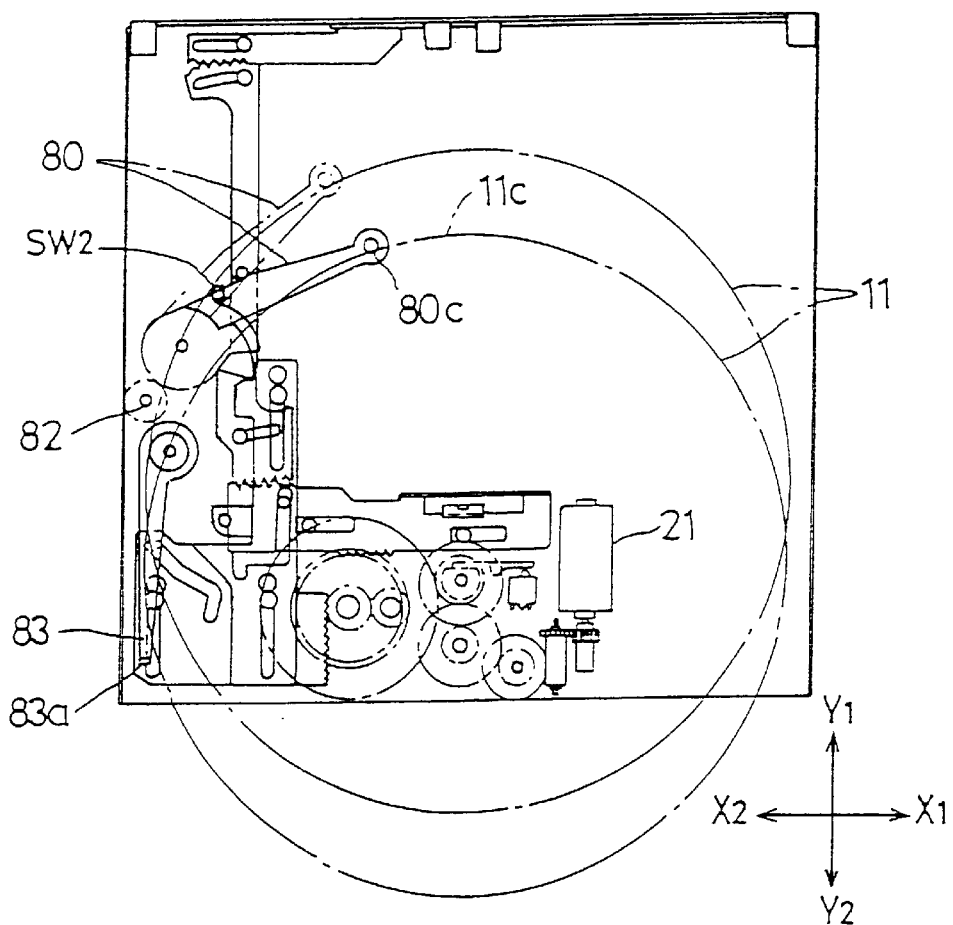
FIG. 20 is a plan view of a disk insertion state.
Figure 21B:
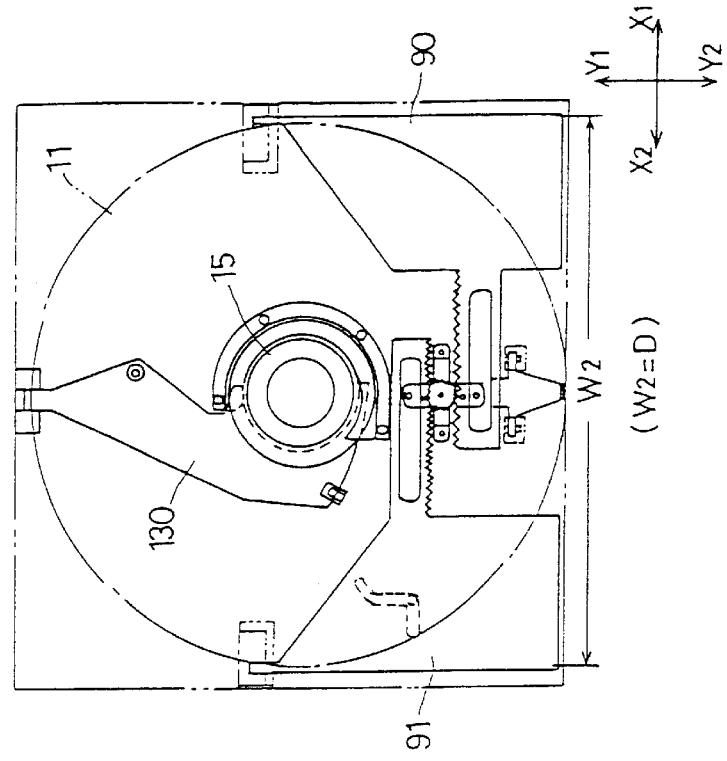
FIGS. 21A and 21B are plan views of a state in which the disk is fully inserted into the disk apparatus.
Figure 21A:
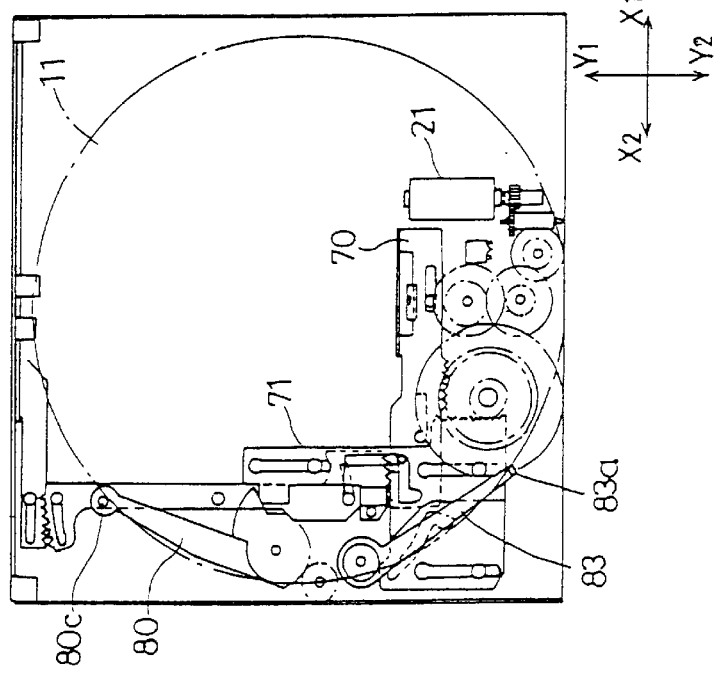
Figure 22:
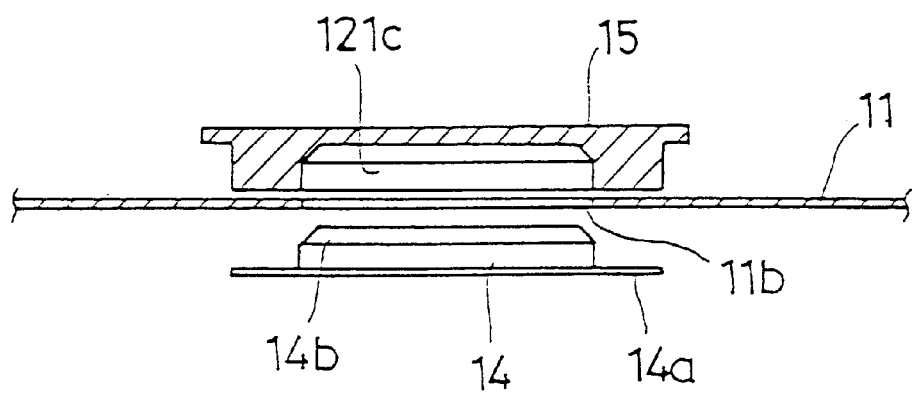
FIG. 22 is a diagram showing the relative positions of the disk, clamper and turntable of FIG. 21.
Figure 23B:
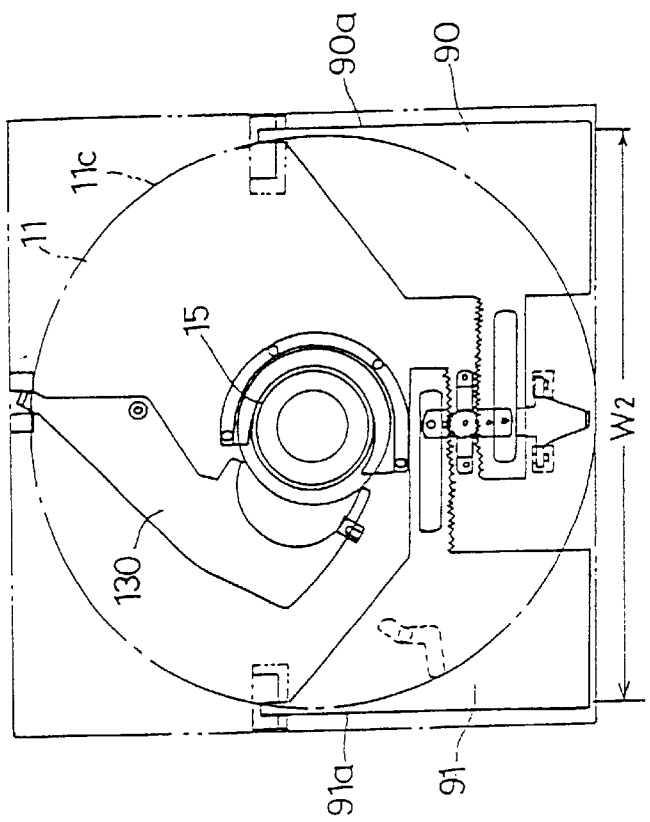
FIGS. 23A and 23B are diagrams showing the disk in a clamped position.
Figure 23A:
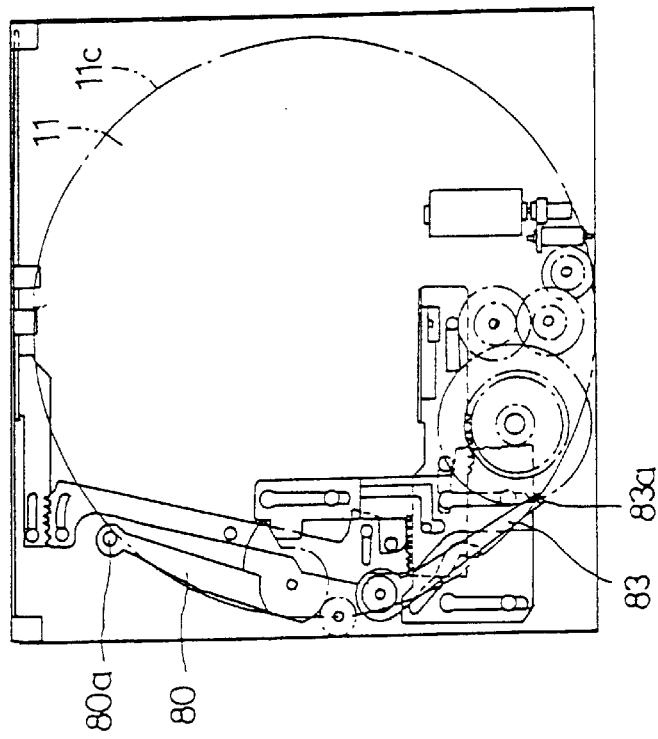

FIG. 19 is a timing chart showing the operations of individual parts during disk loading and disk unloading, with the various components indicated as parts A through K. FIG. 20 is a plan view of a disk insertion state. FIGS. 21A and 21B are plan views of a state in which the disk is fully inserted into the disk apparatus. FIG. 22 is a diagram showing the relative positions of the disk, clamper and turntable of FIG. 21. FIGS. 23A and 23B are diagrams showing the disk in a clamped position. FIGS. 25A and 25B show a state in which disk loading is completed.

Prior to the loading of a disk 11 into the apparatus, the device is in the state indicated in FIGS. 3, 4, 12, 13, 16A, 16B and 18A. The disk support/guide mechanism 25, as shown in FIG. 4, FIG. 5 and in component G of FIG. 19. Is in a state such that the X1-side and X2-side disk support/guide members 90, 91 approach the centerline, with the width W1 in an X direction narrow. The width W1 is smaller than a diameter D of the disk 11.

An operator inserts a disk 11 into the disk insertion slot 13 in the front bezel 12 so that more than half the disk 11 is inside the unit (time t0 through t6). Part K of FIG. 19 shows this action, with the dashed line indicating the extent of manual insertion and the solid line indicated the extent of mechanical, that is, assisted insertion.

As shown in FIG. 4, as the disk 11 is inserted, the Y1 edge thereof, that is, the edge of the disk 11 in the direction of insertion of the disk 11, enters the enclosed substantially planar space 95 formed by the opposed X1-side disk support/guide member 90 and the X2-side disk support/guide member 91 (now in the "narrow" position). At a time t1, the peripheral portion 11c of the disk 11 on the side of the disk 11 in the direction of insertion of the disk 11 contacts the Y2 edge 90a1 of the X1-side lateral plate portion 90a of the X1-side disk support/guide member 90 and the Y2 edge 91a1 of the X2-side lateral plate portion 91a of the X2-side disk support/guide member 91. The disk guide/support members are symmetrical with respect to the centerline in the X1-X2 direction, so the disk 11 is aligned along the X axis such that the center of the centerhole 11b of the disk 11 is aligned with the centerline CL. The X1-side disk support/guide member 90 and the X2-side disk support/guide member 91 move in tandem an equal distance in opposite directions, and thus always remain symmetrically positioned in the X axis with respect to the centerline CL. As a result, the alignment of the center of the centerhole 11b with the centerline CL is retained even as the disk 11 is further inserted into the enclosed substantially planar space 95 formed by the opposed X1-side disk support/guide member 90 and the X2-side disk support/guide member 91.

As the disk 11 is further inserted into the unit, the X1-side disk support/guide member 90 and the X2-side disk support/guide member 91 are pressed by the peripheral portion 11c of the disk 11 on the side of the disk 11 in the direction of insertion and separate further from each other, with the disk 11 gradually widening the space 95 as inserted.

When the disk support/guide member 91 moves in the X2 direction (times t1 through t5), the pin 71f moves through the slit portion 91g of the slit 91g formed in the lower plate 91c, in the X1-X2 direction relative to the slit 91g.

As the disk 11 continues to enter the enclosed substantially planar space 95 the disk 11 contacts the X1-side lateral plate portion 90a of the X1-side disk support/guide member 90 and the X2-side lateral plate portion 91a of the X2-side disk support/guide member 91. Eventually, the width in the X1-X2 direction of the enclosed substantially planar space 95 acquires an extent W2 equivalent to the diameter of the disk 11. The disk 11 is supported in a horizontal position. Thereafter, the peripheral portion 11c of the disk 11 on the side of the disk 11 in the direction of insertion is guides by the inner surfaces of the X1-side lateral plate portion 90a of the X1-side disk support/guide member 90 and the X2-side lateral plate portion 91a of the X2-side disk support/guide member 91 and the disk moves in the Y1 direction while being maintained in a state in which the centerhole 11b of the disk 11 is aligned with the centerline CL.

It should be noted that the Y1 side of the disk 11, as shown in FIG. 22, moves in the Y1 direction between the clamper 15 and the turntable 14.

It should further be noted that, because the disk support/guide members 90, 91 have inclined surfaces 90c1 and 91c1, respectively, as shown in FIG. 5 and FIG. 8A a corner 11a1 intermediate between the recording surface 11a of the disk 11 and the peripheral portion (that is, the edge) 11c of the disk 11 is actually the only part of the disk 11 that comes into contact with the disk supporting surfaces 90c1 and 91c1. As a result, the recording surface 11a of the disk 11 floats free of the disk supporting surfaces 90c1 and 91c1, so as the disk 11 enters the enclosed substantially planar space 95 of the disk support/guide mechanism 25 in an entry process, and as the disk exits the enclosed substantially planar space 95 of the disk support/guide mechanism 25 in an exit process to be described later, the recording surface 11a of the disk 11 is protected from abrasion and damage due to contact with the disk support/guide members 90, 91.

It should further be noted that the disk insertion slot 13 has a substantially flat basal form bevels at the mouth, such that when the disk 11 passes the mouth of the slot 13 the recording surface 11a of the disk 11 is neither abraded nor damaged.

Secondly, as the X1-side disk support/guide member 90 and the X2-side disk support/guide member 91 move in opposite directions away from each other, the stepped portion 90g separates from the arm portion 140 and the hook member 140 becomes tiltable as shown in FIG. 18B. Further, as shown in times t2 through t4 of part H of FIG. 19, after the hook 140a once enters the centerhole 11b of the disk 11, the hook 140a is lifted upward by the opposite edge of the centerhole 11b so as to separate from the centerhole 11b.

Thirdly, as shown in FIG. 20, the peripheral portion 11c of the disk 11 on the side of the disk 11 in the direction of insertion of the disk 11 presses pin 80c provided on the top surface of the tip portion of the first arm 80, causing the first arm 80 to be rotated in the counter-clockwise direction while twisting the torsion coil spring 81, and, as shown in part A of FIG. 19, causing the switch SW2 to be turned ON and the motor 21 to be activated. It should be noted that because the oil clamper 82 is connected to the first arm 80 the insertion of the disk 11 proceeds slowly and with an appropriately heavy feeling.

Thereafter, the individual mechanisms of the disk loading device 10 are operated mainly by the motor 21.

The rotation of the motor 21 is transmitted to the plate mechanism 23 via the reduction gear mechanism 22. As shown in parts F and D of FIG. 19, the step-shaped slit 71c and the pin 70d that engages the step-shaped slit 71c initially cause the loading plate 71 to slide in the Y1 direction during times t6 through t7 and then stop temporarily, during which time (t7 through t8) the first slide plate 70 slides in the X2 direction and then stops, after which the loading plate 71 once again slides in the Y1 direction, during times t8 through t9.

The displacement of the loading plate 71 and the first slide plate 70 causes the disk push-in/push-out mechanism 24, the disk support/guide mechanism 25, the turntable/optical pick-up unit elevating and lowering mechanism 27, clamp mechanism 28, clamp release mechanism 29 and disk retention/support mechanism 30 to operate in a predetermined sequence, a description of which will now be given.

Operations caused by initial movement of the loading plate 71, that is, at times t6 through t7, are as follows.

Firstly, the first arm 80 of the disk push-in/push-out mechanism 24 is pressed by the lug 71e and rotated in the counter-clockwise direction as shown by part I in FIG. 19 and in FIG. 21A, with the pin 80c withdrawing in the Y1 direction.

Secondly, the pin-like lower projection 83b the second arm 83 is guided by the slit portion 71d1 of the slit 71d and, as shown in part J of FIG. 19 and FIG. 21A, rotated in the counter-clockwise direction, with the upper projection 83a on the second arm 83 pushing against the peripheral portion 11c of the partially inserted disk 11 so as to completely insert the partially inserted disk 11 into the disk loading device 10. The disk 11 then attains the state indicated in FIG. 22, in which the centerhole 11b of the inserted disk 11 is positioned directly above the turntable 14.

It should be noted that the pin 71f moves in the Y1 direction within the slit portion 91g2 of the slit 91g. The pin 70d moves relatively in the Y1 direction within the slit portion 91g2 of the slit 91g.

Operations caused by movement of the first slide plate 70 in the X2 direction, that is, at times t7 through t8, are as follows.

As the first slide plate 70 moves in the X2 direction, the second slide plate 110 is slid in the X1 direction as indicated by part E in FIG. 19 via the linkage lever 113, and the turntable/optical pick-up unit elevating and lowering mechanism 27 rises in the Z1 direction as shown by part B in FIG. 19. As a result, the central projecting hub 14b of the turntable 14 engages the centerhole 11b of the inserted disk 11, and the flange 14a supports the disk 11. Additionally, the optical pick-up 17 approaches the recording surface 11a of the disk 11.

Additionally, the movement of the second slide plate 110 in the X1 direction causes the clamp release member 130 to rotate in the clockwise direction as shown in FIG. 23B, such that the fork portion 130a is separated from the clamper support member 123 and the clamper 15 is released from its retention as shown by part C in FIG. 19. The released clamper 15 is then magnetically attracted by the permanent magnet 125 to the turntable 14, and the disk 11 is clamped atop the turntable 14 as shown in FIG. 24.

Operations caused by the loading plate 71 moving once again, that is, at times t8 through t9, are as follows.

Firstly, the first arm 80 of the disk push-in/push-out mechanism 24 is further pushed by the lug 71e and, as shown in part I of FIG. 19 and in FIG. 25A, rotated in the counter-clockwise direction, with the pin 80c displacing in the X2 direction and separating from the peripheral portion 11c of the disk 11.

Secondly, the pin-like lower projection 83b of the second arm 83 is guided by the slit portion 71d2 in the Y direction of the slit 71d and as shown in part J of FIG. 19 and in FIG. 25A is rotated slightly in the clockwise direction, with the upper projection 83a displacing in the X2 direction and separating from the peripheral portion 11c of the disk 11.

Thirdly, the pin 71f enters into slit portion 90g3 and, as shown in part G of FIG. 19 and in FIG. 25B, the X2-side disk support/guide member 91 is moved slightly in the X2 direction, the X1-side disk support/guide member 90 is moved slightly in the X1 direction, and the disk support/guide mechanism 25 enters the "wide" state. The width in the X1-X2 direction of the partially enclosed substantially planar space 95 then attains a dimension W2 greater than the diameter D of the disk 11. As a result, as shown together with FIG. 8B, the inner surfaces of the X1-side lateral plate portion 90a of the X1-side disk support/guide member 90 and the X2-side lateral plate portion 91a of the X2-side disk support/guide member 91 separate from the peripheral portion 11c of the disk 11. Additionally, the disk support surfaces 90c1 and 91c1 are slanted, so as the X1-side disk support/guide member 90 and the X2-side disk support/guide member 91 separate from each other the disk support surfaces 90c1 and 91c1 separate from the lower edge of the peripheral portion 11c of the disk 11, that is, from the corner 11a1 intermediate between the recording surface 11a of the disk 11 and the peripheral portion (that is, the edge) 11c of the disk 11.

As a result of the first, second and third operations described above, the disk 11 is released from restriction at the peripheral portion 11c and can rotate freely, thus putting the disk loading device 10 into a loading state. Up to this point in time the switch SW1 repeatedly turns ON and OFF a predetermined number of times and the motor 21 stops.

Next, the turntable/optical pick-up unit 26 is activated and the disk 11 is rotated and information recorded on the recording surface 11a of the disk 11 is reproduced by the optical pick-up 17 in a time t10 through t11.

Next, a description will be given of the operation of each of the individual mechanisms during an unloading operation of the disk 11.

After reproduction of information recorded on the recording surface 11a of the disk 11 is completed and an eject operation commenced, the motor 21 rotates in reverse and, as shown in parts D and F of FIG. 19 at times t12 through t15, the first slide plate 70 of the plate mechanism 23 moves in the reverse order and in the reverse direction of the above-described loading operation.

That is, as shown by parts F and D of FIG. 19, when the loading plate 71 initially slides in the Y2 direction during times t12 through t13 and thereafter temporarily stops, during this stop down (that is, times t13 through t14), the first slide plate 70 slides in the X1 direction and stops. After the first slide plate 70 stops, the loading plate 71 slides once again in the Y2 direction during time t14 through t15, such that the plate mechanism 23 returns to an initial position.

Operations caused by the initial movement of the loading plate 71, that is, at times t12 through t13, are as follows.

The second arm 83, as shown in part J of FIG. 19 and in FIG. 23A, is rotated slightly in the counterclockwise direction, such that the upper projection 83a provided at the top surface of the tip of the second arm 83 contacts the peripheral portion 11c of the disk 11. Additionally, the lug 71e moves in the Y2 direction and the restorative force of the torsion coil spring 82 rotates the first arm 80 in the clockwise direction as shown in part I of FIG. 19 and in FIG. 23A, contacting the pin 80c to the peripheral portion 11c of the disk 11. As shown in part G of FIG. 19 and in FIG. 23B, the disk support/guide members 90 and 91 move closer together and the inner surfaces of the X1-side lateral plate portion 90a and X2-side lateral plate portion 91a contact the peripheral portion 11c of the disk 11, thus restricting the peripheral portion 11c of the disk 11 and thereby restricting the disk 11 itself.

Operations caused by movement of the first slide plate 70 in the X2 direction, that is, at times t13 through t14, are as follows.

When the first slide plate 70 moves in the X1 direction, the second slide plate 110 is slid in the X2 direction via the linkage lever 113 as shown in part E of FIG. 19 and the turntable/optical pick-up unit elevating and lowering mechanism 27 is lowered in the Z2 direction as shown in part B of FIG. 19. Additionally, the movement of the second slide plate 110 in the X1 direction rotates the clamp release member 130 in the counter-clockwise direction as shown in FIG. 23B, and the fork portion 130a enters the clamp support member 123 and the clamper 15 is magnetically lifted upward against the magnetic attraction of the permanent magnet 125 as shown in part B in FIG. 19.

Operations caused by the loading plate 71 moving once again, that is, at times t14 through t15, are as follows.

Firstly, the pin-like lower projection 83b of the second arm 83 is guided by the slit 71d and rotated in the clockwise direction as shown in part J of FIG. 19, and the upper projection 83a withdraws from the path of transit of the disk 11.

Secondly, the movement of the lug 71e in the Y2 direction causes the torsion coil spring 81 to rotate the first arm 80 in the clockwise direction, such that the pin 80c pushes the peripheral portion 11c of the disk 11, the disk 11 is moved in the Y2 direction and out the front bezel 12, thereby ejecting the disk 11. The disk 11 is guided by the disk guide/support members 90, 91 and the inner surfaces of the lateral plate portions 90a and 91a. Additionally, the operation of the oil clamper 82 causes the loading plate 71 to slow the rotation of the first arm 80, thus slowing the ejection of the disk 11.

The stepped portion 90f separates from the arm portion 140b and, as shown in FIG. 18B, assumes a tiltable position. Additionally, since the portion of the disk 11 projecting externally from the front bezel 12 remains unsupported, the effect of gravity tends to cause the disk 11 to displace downward. However, as the disk 11 moves in the Y2 direction outward from the front bezel 12, the centerhole 11b of the disk 11 comes to oppose the hook 140a, the disk retention/support mechanism 30 moves as indicated in FIGS. 26A, 26B during the time t17 through t18 of part H of FIG. 19, with the hook 140a retaining the edge of the disk 11 centerhole 11b. As a result, as shown in FIGS. 26A, 26B, the edge of the centerhole 11b of the disk 11 is retained by the hook member 140 and the movement of the disk 11 in the Y2 direction is stopped, in a state in which approximately half the disk 11 is projecting outside the front bezel 12. Accordingly, even if the disk 11 attempts to displace downward in the direction of gravitational pull the disk 11 is nevertheless supported so that it does not drop downward. In such a state approximately three quarters of the centerhole 11b of the disk 11 projects outward from and is exposed externally of the disk insertion slot 13 in the front bezel 12, in a state shown in FIGS. 26A and 26B.

The extent to which the disk 11 projects externally from the disk loading device 10 in a state in which unloading is completed is determined not by the final rotational position of the first arm 80 but by the hook member 140. Accordingly, even assuming some variation in the final rotational position of the first arm 80 from one fully assembled disk loading device 10 to the next, the extent to which the disk 11 projects from the disk loading device 10 remains constant.

In a state in which unloading is completed, an operator can insert the tips of the fingers into the centerhole 11b of the projecting disk 11 and grasp and extract the disk 11 by the peripheral portion 11c of the disk 11 and the centerhole 11b. By so doing, the hook 140a separates from the centerhole 11b and rises above the top surface of the disk 11, thus releasing the disk 11. The advantage of such an arrangement is that the recording surface of the disk remains untouched.

Once the disk 11 is extracted, the disk support/guide members 90, 91 are driven toward each other by the coil spring 96 and the disk support/guide mechanism 25 assumes the initial narrow state, with the hook 140a rising in the Z1 direction.

As will be appreciated by those skilled in the art, when the disk 11 is inserted vertically, the turntable/optical pick-up unit 26 can move in the X1-X2 direction.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application Nos. 2000-169415, 2000-169418 and 2000-

169420, all filed on Jun. 6, 2000, the entire contents of which are hereby incorporated by reference.

What is claimed is:

1. A disk loading device for loading a disk into a disk loading device frame and unloading the inserted disk from the disk loading device frame, the disk loading device comprising:
    a first arm having a contacted part for contacting an edge of the disk in a direction of insertion of the disk and moving through a first plane parallel to a plane of movement of the disk;
    a second arm having a contacting part for contacting an edge of the disk in a direction opposite the direction of insertion of the disk and moving through a second plane parallel to the plane of movement of the disk;
    a motor that rotates the first arm and the second arm; and
    a control mechanism that causes the motor to rotate the second arm so that the contacting part of the second arm pushes the disk into the disk loading device when the disk is manually partially inserted in the disk loading device during a loading operation, and causes the motor to rotate the second arm during an unloading operation so as to retreat from a path of transit of the disk and to cause the first arm to rotate so that the contacting part of the second arm pushes the disk out from the disk loading device.

2. The disk loading device as claimed in claim 1, further comprising a disk support/guide member that supports and guides the disk during loading and separates from the disk during recording and/or reproduction of information to and form the disk.

3. The disk loading device of claim 2, further comprising:
    a turntable for accommodating the inserted disk;
    a clamper for clamping the disk to the turntable during reproduction and/or recording of information to and from the surface of the disk, the clamper being released after reproduction terminates;
    a supporting member for supporting the clamper on an interior surface of a cover part of the disk loading device frame;
    a clamp release member provided on the interior surface of the cover part of the disk loading device frame and movable in a direction parallel to the interior surface of the cover part, the clamp release member being inserted between the supporting member and the clamper so as to release the clamper from the turntable; and
    a clamp release member movement mechanism that inserts the clamp release member between the supporting member and the clamper and moving the clamp release member in a direction parallel to the interior surface of the cover part of the disk loading device frame after reproduction and/or recording of information to and from the disk has terminated.

4. The disk loading device of claim 2, further comprising:
    a disk retention/support mechanism that retains an edge of a centerhole of the disk as the disk is being unloaded so as to retain and support the disk in a position at which the disk projects approximately halfway out of a disk insertion slot located on a front panel of the disk loading device frame in order to prevent the disk from falling out of the insertion slot.

5. The disk loading device as claimed in claim 4, wherein the disk retention/support mechanism is disposed so as to retain an edge of the centerhole in a state in which the centerhole externally projects at least partially from the disk insertion slot.

6. The disk loading device of claim 1, further comprising:
    a turntable for accommodating the inserted disk;
    a clamper for clamping the disk to the turntable during reproduction and/or recording of information to and from the disk, the clamper being released after reproduction and/or recording terminates;
    a supporting member for supporting the clamper on an interior surface of a cover part of the disk loading device frame;
    a clamp release member provided on the interior surface of the cover part of the disk loading device frame and movable in a direction parallel to the interior surface of the cover part, the clamp release member being inserted between the supporting member and the clamper so as to release the clamper from the turntable; and
    a clamp release member movement mechanism that inserts the clamp release member between the supporting member and the clamper and moving the clamp release member in a direction parallel to the interior surface of the cover part of the disk loading device frame after reproduction and/or recording of information to and from the disk has terminated.

7. The disk loading device of claim 6, further comprising:
    a disk support/guide member that supports and guides the disk during loading and separates from the disk during recording and/or reproduction of information to and form the disk; and
    a disk retention/support mechanism that retains an edge of a centerhole of a disk as the disk is being unloaded so as to retain and support the disk in a position at which the disk projects approximately halfway from a disk insertion slot located on a front panel of the disk loading device frame.

8. The disk loading device as claimed in claim 2, wherein the disk support/guide member comes into contact with an edge of the disk and moves along with the edge of the disk as the disk is inserted in the disk loading device so as to guide the disk to a prescribed position.

9. An apparatus for recording information to and/or reproducing information from a disk comprising a disk loading device for loading the disk into a disk loading device frame and unloading the inserted disk from the disk loading device frame, the disk loading device comprising:
    a first arm having a contacted part for contacting an edge of the disk in a direction of insertion of the disk and moving through a first plane parallel to a plane of movement of the disk;
    a second arm having a contacting part for contacting an edge of the disk in a direction opposite the direction of insertion of the disk and moving through a second plane parallel to the plane of movement of the disk;
    a motor that rotates the first arm and the second arm; and
    a control mechanism that causes the motor to rotate the second arm so that the contacting part of the second arm pushes the disk into the disk loading device when the disk is manually partially inserted in the disk loading device during a loading operation, and causes the motor to rotate the second arm during an unloading operation so as to retreat from a path of transit of the disk and to cause the first arm to rotate so that the contacting part of the second arm pushes the disk out from the disk loading device during an unloading operation.

* * * * *